United States Patent
Wang et al.

(10) Patent No.: US 11,848,787 B2
(45) Date of Patent: Dec. 19, 2023

(54) MULTIPLEXED COMMUNICATION FOR A BASE STATION AND A PROGRAMMABLE LOGIC CONTROLLER

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US); Lik Hang Silas Fong, Somerset, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 134 days.

(21) Appl. No.: 16/733,088

(22) Filed: Jan. 2, 2020

(65) Prior Publication Data
US 2021/0211243 A1    Jul. 8, 2021

(51) Int. Cl.
*H04L 1/18*    (2023.01)
*H04L 1/1867*    (2023.01)

(52) U.S. Cl.
CPC .......... *H04L 1/1887* (2013.01); *H04L 1/1896* (2013.01)

(58) Field of Classification Search
None
See application file for complete search history.

(56) References Cited

U.S. PATENT DOCUMENTS

| | | | |
|---|---|---|---|
| 10,051,617 B2 * | 8/2018 | Nory | H04L 27/0006 |
| 2006/0153061 A1 | 7/2006 | Nishio | |
| 2009/0175291 A1 * | 7/2009 | Galli | H04B 3/544 370/442 |
| 2010/0293428 A1 * | 11/2010 | Luo | H04H 20/06 714/E11.131 |
| 2011/0064061 A1 * | 3/2011 | Takeuchi | H04L 1/1854 370/336 |
| 2013/0016686 A1 * | 1/2013 | Li | H04L 1/1864 370/329 |
| 2013/0132788 A1 * | 5/2013 | Braun | H04L 1/1896 714/750 |
| 2013/0250843 A1 | 9/2013 | Zhou et al. | |
| 2014/0177456 A1 * | 6/2014 | Boudreau | H04B 7/15592 370/252 |
| 2014/0307597 A1 * | 10/2014 | Kim | H04L 5/1469 370/280 |

(Continued)

FOREIGN PATENT DOCUMENTS

| | | |
|---|---|---|
| EP | 1630991 A1 | 3/2006 |
| EP | 2879462  * | 3/2015 |

(Continued)

OTHER PUBLICATIONS

International Search Report and Written Opinion—PCT/US2020/066946—ISA/EPO—dated Mar. 29, 2021.

*Primary Examiner* — Phirin Sam
(74) *Attorney, Agent, or Firm* — Procopio, Cory, Hargreaves & Savitch LLP/Qualcomm Incorporated

(57) ABSTRACT

A base station receives feedback for a first data transmission or an indication to retransmit a first data transmission, the first data transmission being transmitted to at least one wireless device from another wireless device. The base station transmits, in response to the feedback or the indication, a retransmission of the first data transmission in a downlink transmission to the at least one wireless device.

31 Claims, 21 Drawing Sheets

(56) References Cited

U.S. PATENT DOCUMENTS

| | | | |
|---|---|---|---|
| 2015/0110082 A1* | 4/2015 | Sun | H04W 72/082 |
| | | | 370/336 |
| 2015/0180635 A1 | 6/2015 | Fujishiro et al. | |
| 2015/0222407 A1* | 8/2015 | Nammi | H04B 7/0413 |
| | | | 370/336 |
| 2016/0234851 A1* | 8/2016 | Zhang | H04W 72/08 |
| 2018/0049234 A1 | 2/2018 | Lee et al. | |
| 2018/0176893 A1* | 6/2018 | Zhang | H04W 72/042 |
| 2018/0199268 A1 | 7/2018 | Wang et al. | |
| 2018/0213484 A1* | 7/2018 | Oh | H04W 52/42 |
| 2019/0045578 A1* | 2/2019 | Oyman | H04L 43/0852 |
| 2019/0052415 A1* | 2/2019 | Nammi | H04L 1/0057 |
| 2019/0132784 A1* | 5/2019 | Thubert | H04W 72/044 |
| 2019/0141742 A1* | 5/2019 | Zhou | H04L 5/0057 |
| 2019/0357238 A1* | 11/2019 | Zhou | H04L 5/0082 |
| 2019/0357262 A1* | 11/2019 | Cirik | H04W 72/0453 |
| 2020/0106563 A1* | 4/2020 | Akoum | H04L 1/08 |
| 2020/0145169 A1* | 5/2020 | Zhou | H04W 76/27 |
| 2020/0153556 A1* | 5/2020 | Nammi | H04L 1/06 |
| 2020/0213046 A1* | 7/2020 | Wang | H04L 1/1861 |
| 2020/0350969 A1* | 11/2020 | Shimezawa | H04W 24/10 |
| 2020/0351028 A1* | 11/2020 | Wang | H04L 1/1816 |
| 2020/0351729 A1* | 11/2020 | Rastegardoost | H04W 36/0072 |
| 2020/0366423 A1* | 11/2020 | Lee | H04L 1/1887 |
| 2021/0029691 A1* | 1/2021 | Bassirat | H04W 72/048 |
| 2021/0168851 A1* | 6/2021 | Kim | H04W 74/0833 |
| 2021/0176791 A1* | 6/2021 | Cirik | H04W 72/0453 |
| 2021/0211251 A1* | 7/2021 | Byun | H04W 74/0833 |
| 2021/0352580 A1* | 11/2021 | Zhou | H04B 7/0486 |
| 2021/0360683 A1* | 11/2021 | Chen | H04L 5/0053 |
| 2022/0022250 A1* | 1/2022 | Cirik | H04L 5/0053 |
| 2022/0053509 A1* | 2/2022 | Bulakci | H04W 28/0268 |
| 2022/0086919 A1* | 3/2022 | Hofström | H04W 72/542 |
| 2022/0141856 A1* | 5/2022 | Xia | H04W 72/044 |
| | | | 370/329 |

FOREIGN PATENT DOCUMENTS

| | | |
|---|---|---|
| EP | 2869665 A1 | 5/2015 |
| EP | 2879462 A1 | 6/2015 |
| WO | 2012071736 A1 | 6/2012 |

* cited by examiner

MULTIPLEXED COMMUNICATION FOR A BASE STATION AND A PROGRAMMABLE LOGIC CONTROLLER

BACKGROUND

Technical Field

The present disclosure relates generally to communication systems, and more particularly, to wireless communication including retransmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus receives feedback for a first data transmission or an indication to retransmit a first data transmission, the first data transmission being transmitted to at least one wireless device from another wireless device. Then, the apparatus transmits, in response to the feedback or the indication, a retransmission of the first data transmission in a downlink transmission to the at least one wireless device.

In another aspect of the disclosure, a method, a computer-readable medium, and an apparatus are provided for wireless communication. The apparatus receives data from a wireless device in a downlink transmission or a sidelink transmission. The apparatus transmits feedback for the data to one or more of the wireless device or a base station and receives a retransmission of the data in a downlink transmission from the base station.

In another aspect of the disclosure, a method, a computer-readable medium, and an apparatus are provided for wireless communication at a wireless device. The apparatus selects a first bandwidth part (BWP) for transmitting data for at least one additional wireless device, wherein the BWP is based on a BWP for a base station. Then, the apparatus transmits the data for the at least one additional wireless device using the selected BWP.

In another aspect of the disclosure, a method, a computer-readable medium, and an apparatus are provided for wireless communication at a wireless device. The apparatus transmits first data in a downlink transmission or a sidelink transmission to at least one additional wireless device and receives hybrid automatic repeat request (HARQ) feedback or a request for a retransmission for the first data from the at least one additional wireless device. Then, the apparatus transmits the first data in an uplink channel to a base station for the retransmission to the at least one additional wireless device in response to the HARQ feedback or the request for the retransmission.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

DETAILED DESCRIPTION

Figure 1:
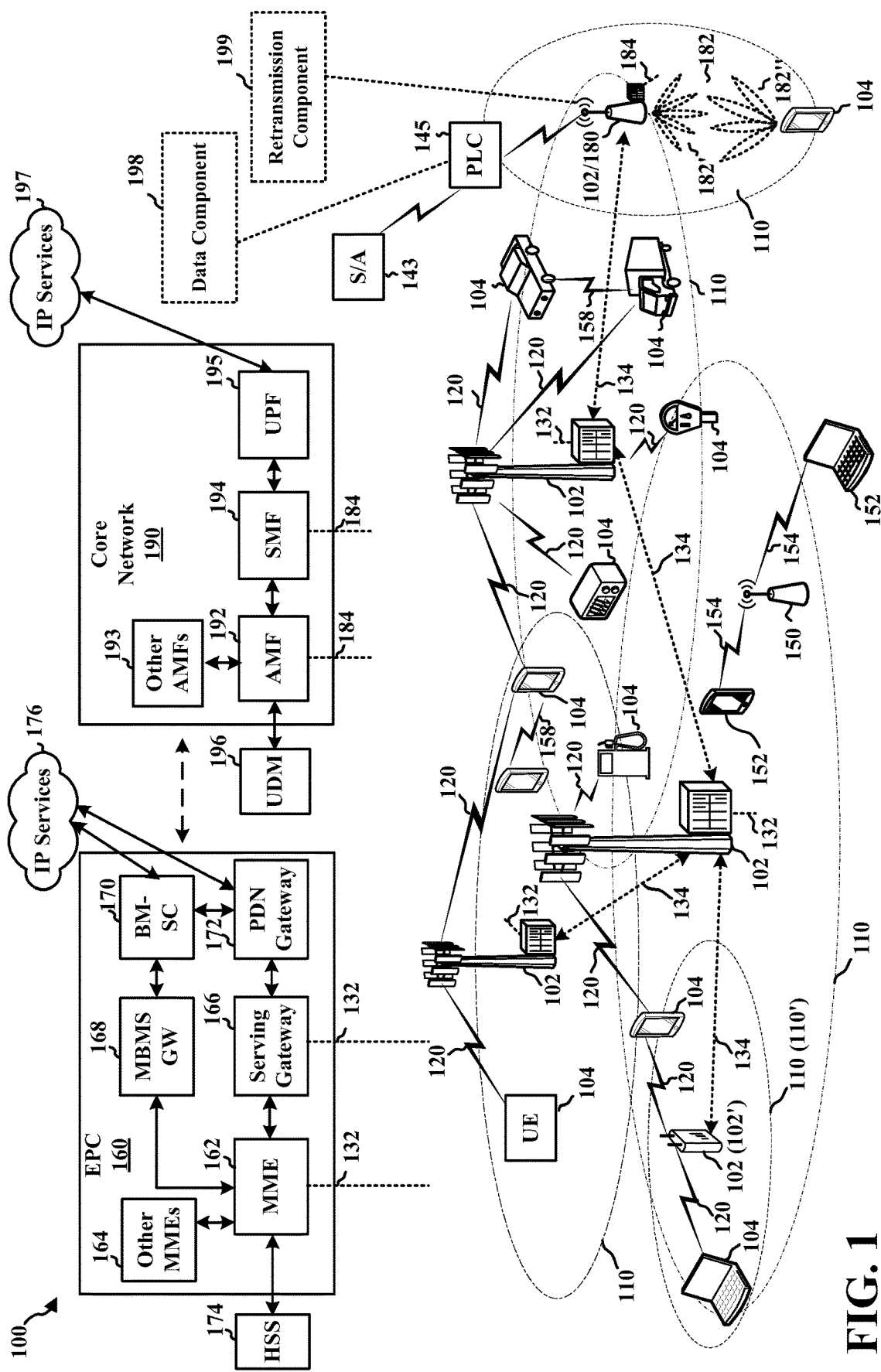
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some wireless communication may be performed in connection with factory automation, e.g., and may comprise Industry IoT (IIoT) based communication. Some equipment may include a sensor, an actuator, a piece of industrial equipment, etc. A Programmable Logic Controller (PLC) may receive information from such sensor(s)/actuator(s) and may provide commands to the sensor(s)/actuator(s) or to factory equipment associated with the sensor(s)/actuator(s). For example, a PLC may automate control of machines and control systems of industrial electromechanical processes, such as controlling machinery on factory assembly lines, amusement rides, light fixtures, etc. The communication between the PLC and the sensors/actuators may have low latency requirements and high reliability requirements. For example, the communication may a latency requirement of less than 2 ms or less than 1 ms. The communication may have a reliability requirement on the order of $10^{-5}$ or $10^{-6}$, such as 99.9999% reliability. The latency and reliability may apply to data and control channels.

Aspects of the present disclosure help to reduce latency and improve reliability by providing for retransmission of blocked transmissions between a PLC and a sensor/actuator, the retransmission being provided by a base station. For example, a PLC may transmit a first data transmission to sensor(s)/actuator(s) and may receive feedback indicating for the data to be retransmitted to the sensor(s)/actuator(s). The PLC may provide the data to a base station, and the base station may retransmit the data to the sensor(s)/actuator(s). The base station may provide the retransmission in a proactive manner or a reactive manner, as presented herein. The retransmission by the base station may improve the reliability of the communication between the PLC and the sensor/actuator.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to measure and select receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication may be performed in connection with factory automation, e.g., and may comprise IIoT based communication. Some equipment may include a sensor, an actuator, a piece of industrial equipment, etc. A PLC 145 may receive information from such sensor(s)/actuator(s) 143 and may provide commands to the sensor(s)/actuator(s) 143 or to factory equipment associated with the sensor(s)/actuator(s) 143. For example, a PLC may automate control of machines and control systems of industrial electromechanical processes, such as controlling machinery on factory assembly lines, amusement rides, light fixtures, etc. In some aspects, a PLC 145 may transmit data, either uplink data or sidelink data, to sensor(s)/actuator(s) 143. The PLC 145 may include a data component 198 configured to transmit the data in an uplink channel to a base station 102/180 for retransmission to the sensor(s)/actuator(s) 143 in response to negative feedback or a request for retransmission from the sensor(s)/actuator(s) 143. The base station 102/180 may receive the data from the PLC 145 for the sensor(s)/actuator(s) 143. Then, the base station 102/180 may include a retransmission component 199 configured to transmit a retransmission of the data from the sensor(s)/actuator(s) 143 to the PLC 145 in response to receiving feedback or a request for retransmission from the PLC 145 or from the sensor(s)/actuator(s) 143. In some examples, the base station 102/180 may include a 5G NR base station, such as a gNB. The concepts described herein may also be applicable to other similar areas, such as LTE, LTE-A, CDMA, GSM, and other wireless technologies.

Figure 2:
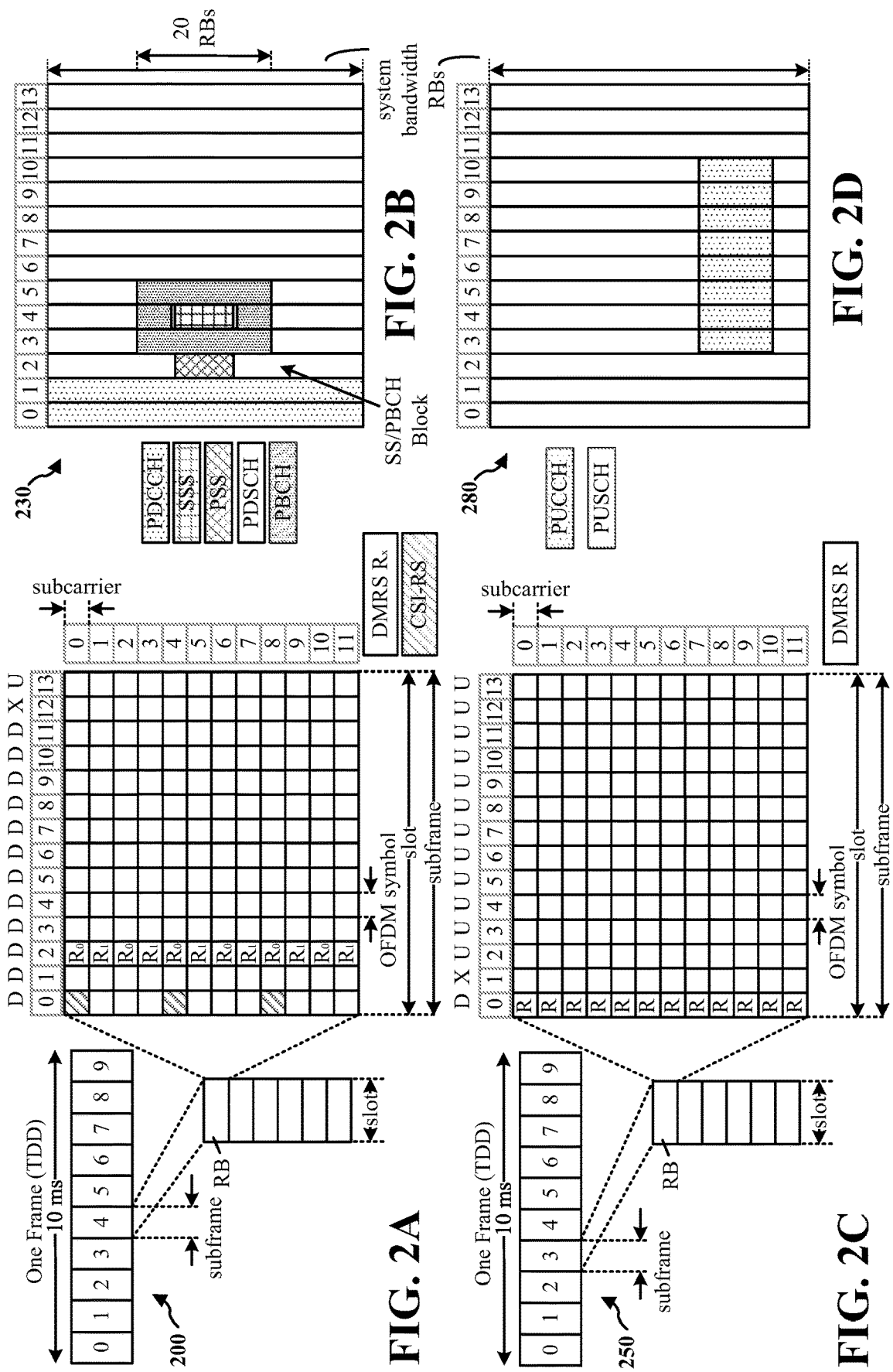
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
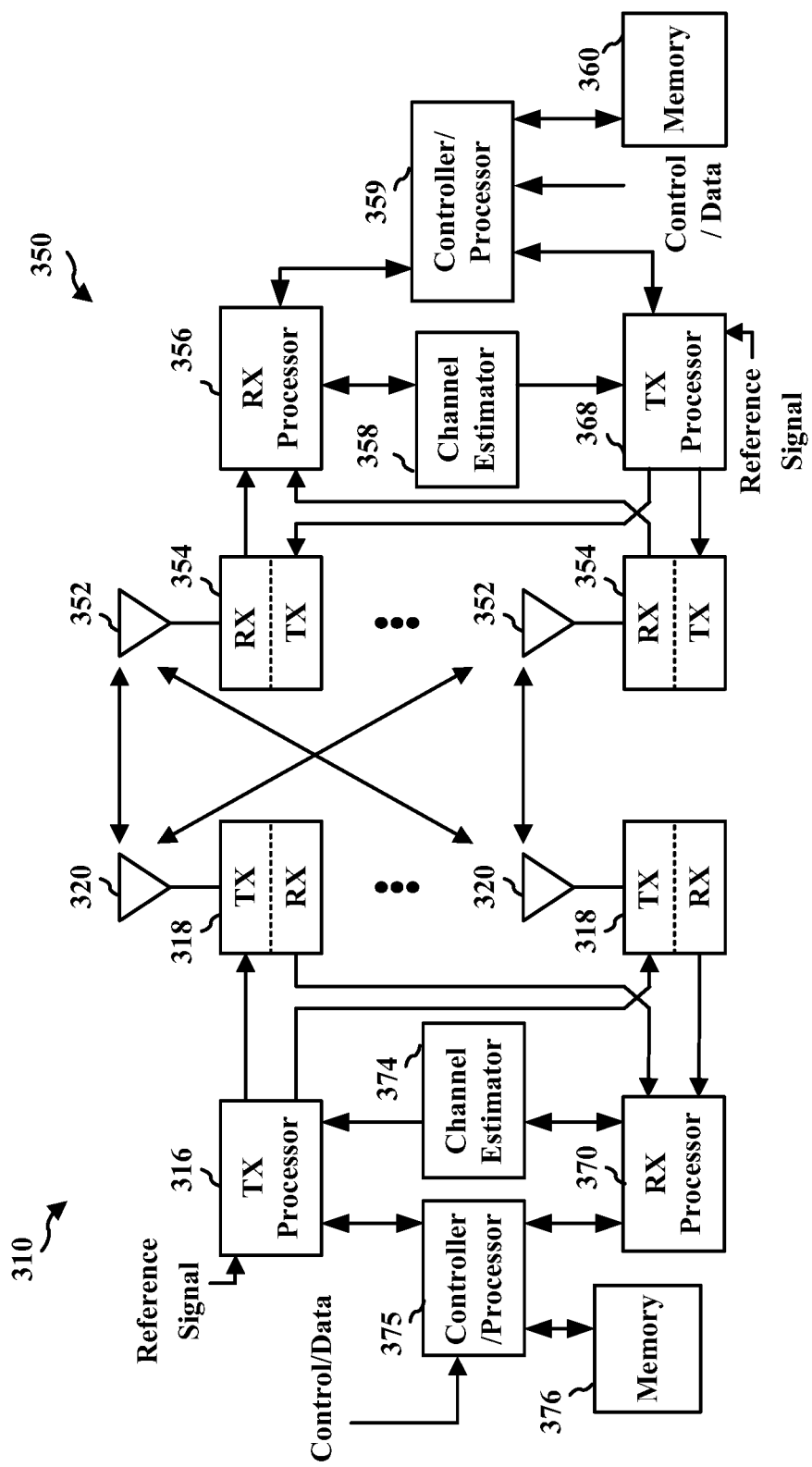
FIG. 3 is a diagram illustrating an example of a base station and user equipment (UE) in an access network.

FIG. 3 is a block diagram of a base station 310 in communication with a wireless device 350 in an access network. The wireless device may correspond to a PLC, a UE, a sensor/actuator, etc. In some examples, a PLC may transmit downlink communication to a sensor/actuator, and therefore, may operate similarly to base station 310. For example, the wireless device 350 may correspond to the PLC 145 in FIG. 1. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), resegmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4A:
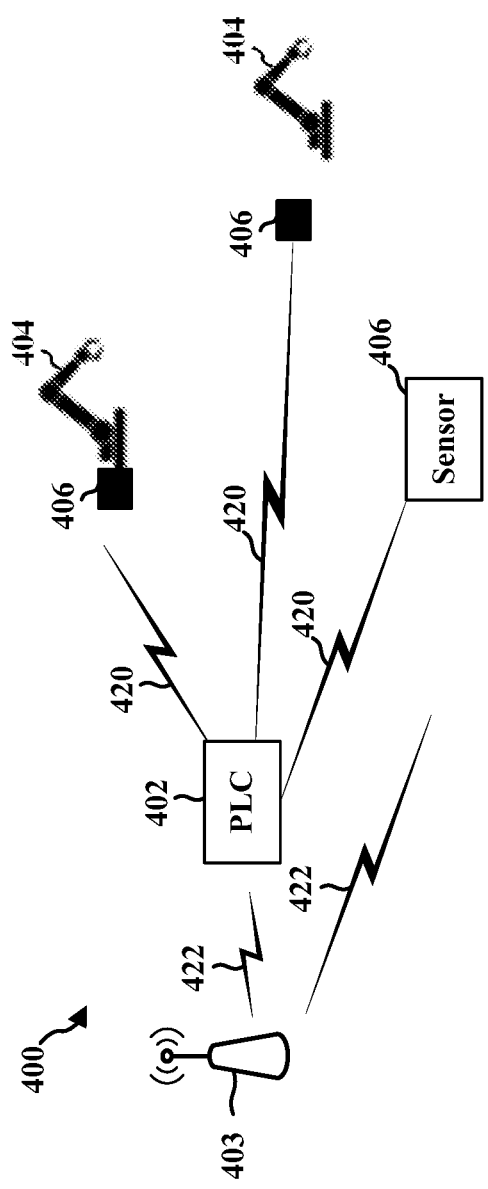
FIG. 4A illustrates an example wireless communication system including a base station, a PLC, and sensor(s)/actuator(s).

Wireless communication may be based on IIoT. Such communication may include communication between a PLC and sensors, actuators, etc. The PLC may provide commands in wireless signals to factory equipment. Sensor(s)/actuator(s) may be separate from the factory equipment and/or may be comprised in or positioned at a piece of factory equipment. The PLC(s) may automate control of machines and control systems, e.g., of industrial electromechanical processes, such as control of machinery on factory assembly lines, amusement rides, light fixtures, etc. FIG. 4A illustrates an example communication system 400 including a PLC 402 that exchanges wireless communication 420 with sensors/actuators 406 that may be associated with equipment 404. The communication may also include a base station 403 that exchanges communication 422 with the PLC 402 and/or communication 422 with the sensors/actuators 406.

The communication between the PLC 402 and sensor(s)/actuator(s) 406 may include cyclic exchanges of information. The PLC 402 may potentially exchange cyclic information with a large number of sensors/actuators 406.

Figure 4B:
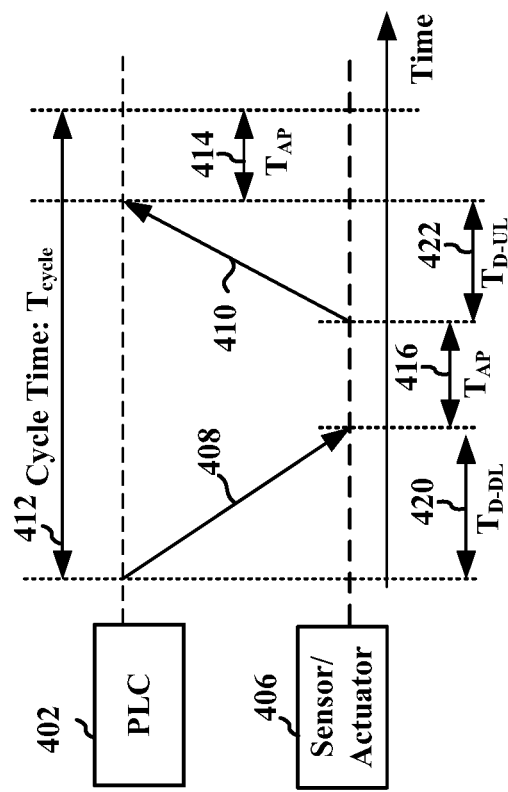
FIG. 4B illustrates an example communication cycle between a PLC, and a sensor/actuator.

FIG. 4B illustrates an example of periodic or cyclic traffic that may be exchanged between the PLC 402 and a sensor/actuator 406. The PLC 402 may transmit communication 408 such as a command or other communication to sensor/actuator 406 or equipment 404 during a period of time TD-DL, 420. The communication 408 from the PLC to the sensor/actuator may be referred to as downlink communication. The sensor/actuator 406 may receive the communication 408, and may take an action based on the command. Following the action, the sensor/actuator 406 may transmit communication 410 back to the PLC 402 during period of time $T_{D-UL}$, 422. For example, a sensor may respond with location information, temperature information, etc. The sensor may report back to the PLC 402 a result that occurs due to action from a command received from the PLC 402. The report may comprise an acknowledgement, e.g., a simple application layer acknowledgment. As well, the sensor may report a current status of the sensor following a command, e.g., an updated location, etc. There may be a processing time duration 416 ($T_{AP}$) e.g., an actuation and/or sensing duration between receipt of the communication 408 from the PLC and transmission of the communication 410 from the sensor/actuator 406. The communication 410 that is transmitted from the sensor/actuator 406 to the PLC 402 may be referred to as uplink communication. Following the PLC's receipt of the communication 410 from the sensor/actuator 406, there may be a processing duration 414 ($T_{AP}$) during which the PLC 402 processes the received information, e.g., communication 410, and before the PLC 402 sends additional communication/commands to the sensor/actuator 406. The combined cycle may have a duration 412 of length $T_{cycle}$. Following the duration $T_{AP}$, the cycle may repeat with the PLC 402 sending additional communication 408 to the sensor/actuator 406. The communication system 400 may accommodate periodic, regular traffic between PLCs 402 and sensors/actuators 406, e.g., downlink traffic from the PLC 402 to the sensors/actuators 406 and uplink traffic from the sensors/actuators 406 to the PLC 402. The communication between the PLC and the sensors/actuators 406 may be associated with a low latency and high reliability. For example, the communication may be based on a latency of less than 2 ms or less than 1 ms. The communication may have a reliability requirement on the order of $10^{-5}$ or $10^{-6}$, such as 99.9999% reliability. The latency and reliability may apply to data and control channels.

Figure 5:
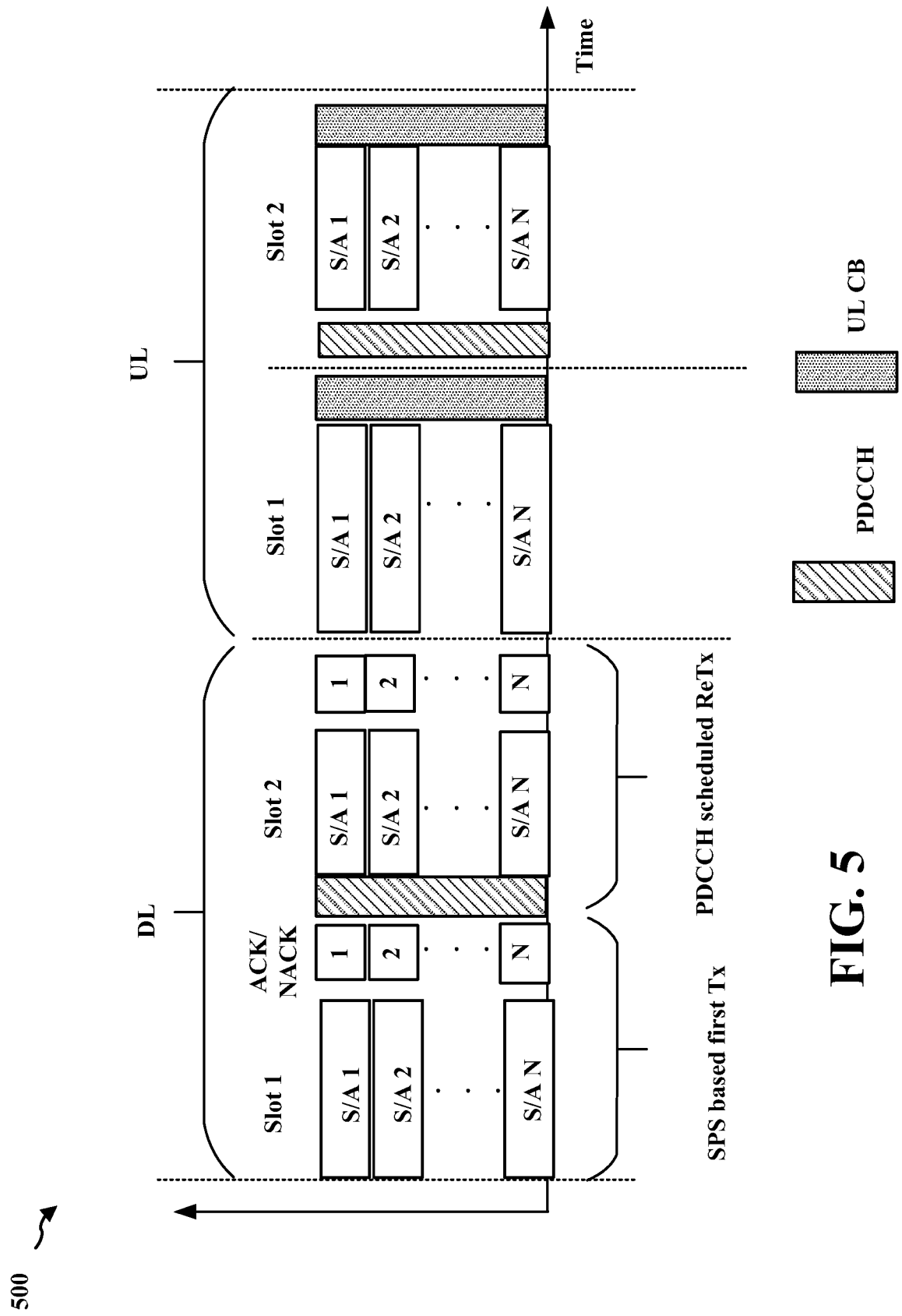
FIG. 5 illustrates an example use of wireless resources for transmission of control and data between a PLC and sensor(s)/actuator(s).

The PLC may use a control channel, such as a PDCCH, to grant resources to a sensor/actuator 406 for use in transmitting the periodic uplink communication 410. Factory automation may involve a high sensor/actuator 406 density, e.g., approximately 1 UE per $m^2$. Therefore, a large number of sensors/actuators 406 may communicate with the PLC 402. Sending a dynamic grant, e.g., one DCI per slot, to each of the large number of sensors/actuators 406 may place a burden on PDCCH overhead. Semi-Persistent Scheduling (SPS) may be used to reduce the overhead requirements of PDCCH by enabling the sensors/actuators 406 to be granted resources in a semi-persistent or periodic manner. SPS may also be used to schedule resources for receiving downlink communication. The SPS may be communicated to each sensor/actuator 406 using RRC signaling and/or DCI. In some examples, SPS may be used for a first transmission, and PDCCH may be used to schedule a possible retransmission if the first transmission is not accurately received. FIG. 5 illustrates a communication diagram 500 showing downlink transmissions from a PLC to sensor/actuator 1 (S/A 1), sensor/actuator 2 (S/A 2 and so forth until the downlink transmission for sensor/actuator N (S/A N) in a slot 1 based on SPS. ACK/NACK feedback is received from each of the sensors/actuators. Based on the feedback, the PLC may transmit PDCCH to schedule resources for a retransmission of the information to the sensors/actuators from which a NACK is received or from which an ACK is not received. For uplink communication, the PLC may receive uplink transmissions from sensor/actuator 1 (S/A 1), sensor/actuator 2 (S/A 2), . . . , sensor/actuator N (S/A N) in a slot 1 based on SPS. The PLC may provide ACK/NACK feedback to each of the sensor/actuators. The PLC may transmit PDCCH to the sensors/actuators scheduling a retransmission for information that was not correctly received by the PLC.

Figure 6B:
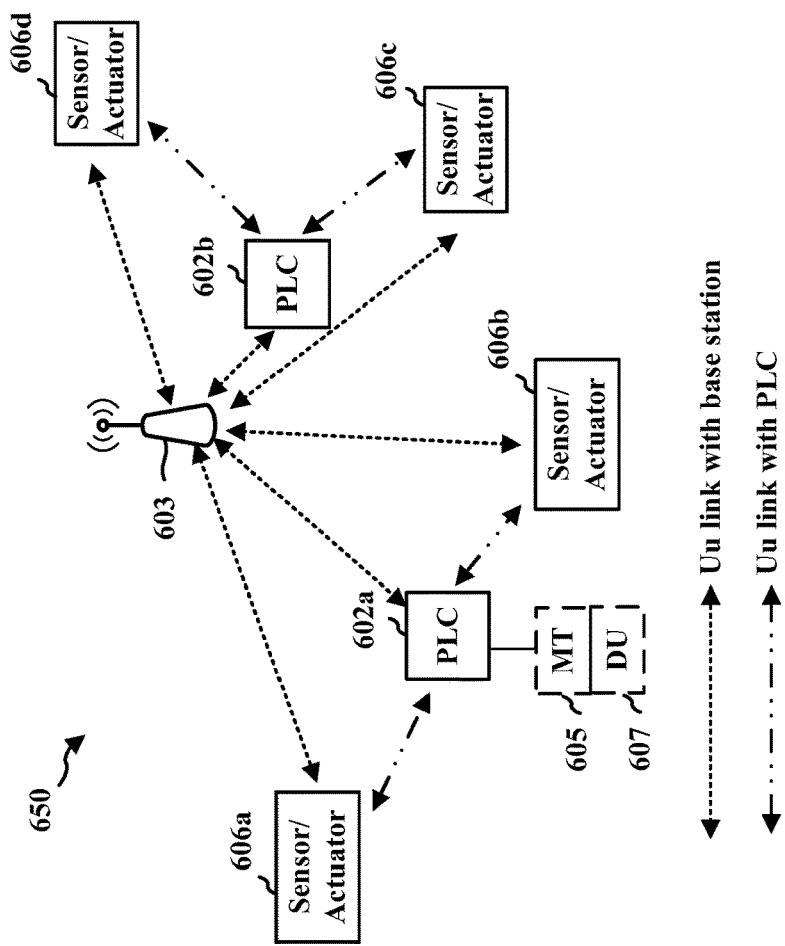
FIGS. 6A and 6B illustrate example aspects of a wireless communication system including a base station, PLC(s), and sensors/actuators.
Figure 6A:
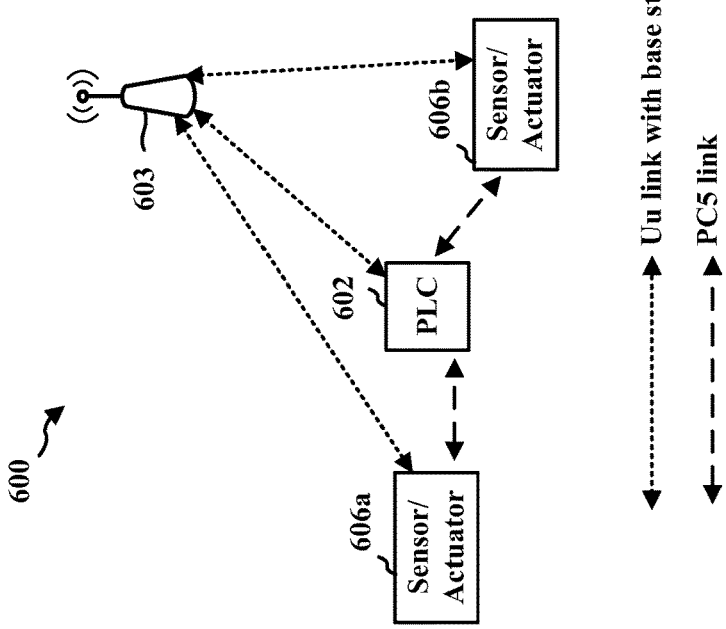

A wirelessly connected PLC may be located closer to factory equipment. For example, PLCs may be located close to machinery, whereas a base station may be ceiling mounted or at a greater distance from the equipment. FIGS. 6A and 6B illustrate communication systems 600 and 650 that include one or more PLCs, multiple sensors/actuators, and a base station.

In FIG. 6A, the communication system 600 includes a PLC 602, multiple sensors/actuators 606a and 606b, and a base station 603. As illustrated, the link between the base station 603 and the PLC may be based on a Uu interface. The links between the base station 603 and the sensors/actuators 606a and 606b may also be based on a Uu interface. The links between the PLC 602 and the sensors/actuators 606a and 606b may be based on a PC5 interface. The PLC 602 in FIG. 6A may operate similar to a UE or as a sidelink device. The PLC 602 in FIG. 6A may use the base station 603 for inter-PLC coordination with other PLCs. The PLC 602 in FIG. 6A may use the base station 603 for a backhaul to a human machine interface (HMI). The PLC 602 in FIG. 6A may use the base station 603 as a system controller. The base station 603 may perform interference management (IM) across multiple PLCs 602. The base station 603 may handle other network functions for the sensors/actuators 606a and 606b, such as initial access with the network, mobility, etc. As the sensors/actuators 606a and 606b communicate with the PLC based on sidelink and with the base station 603 based on uplink/downlink, the sensors/actuators 606a and 606b support both Uu and PC5 based communication. As the PLC 602 communicates with the sensors/actuators 606a and 606b based on sidelink and with the base station 603 based on uplink/downlink, the PLC 602 supports both Uu and PC5 based communication.

In some examples, the PLC 602 may operate similar to a small cell or a relay node having a wireless backhaul to the base station 603. In FIG. 6B, the communication system 650 includes PLC 602a and 602b, multiple sensors/actuators 606a, 606b, 606c, and 606d, and a base station 603. As illustrated, the link between the base station 603 and the PLC may be based on a Uu interface. The links between the base station 603 and the sensors/actuators 606a, 606b, 606c, and 606d may be based on a Uu interface. The sensors/actuators 606a, 606b, 606c, and 606d may interact with their respective PLC 602a, 602b based on a Uu interface. The PLCs 602a and 602b may use the base station 603 for inter-PLC coordination between 602a and 602b, for a backhaul to an HMI, for a system controller, etc. The PLCs 602a and 602b may include aspects of an integrated access and backhaul (IAB) framework. The PLCs may each operate based on dual roles. The PLCs 602a and 602b may each include a mobile termination (MT) component 605, e.g., that operates similar to a UE in receiving control/data from the base station 603. The PLCs 602a and 602b may each include a distributed unit (DU) component 607 that schedules resources for communication with their respective sensors/actuators 606a, 606b, 606c, and 606d and that provides downlink communication to their respective sensors/actuators 606a, 606b, 606c, and 606d.

The transmission of control by the base station 603 may help to improve reliability. Such control by the base station 603 may involve two hops in order to provide the control to the sensor/actuator, e.g., a first hop from a PLC to the base station and a second hop from the base station to the sensor/actuator. In some examples, a portion of scheduling for the sensors/actuators 606a and 606b may be provided by the base station 603, and another portion of the scheduling for the sensor/actuators 606a and 606b may be provided by the PLC 602. Providing some control directly from the PLC may help to reduce over-the-air signaling and may improve latency. However, transmissions from the PLC may be blocked for a particular sensor/actuator. Blocks of links between PLCs and various sensors/actuators may last for different amounts of time.

Figure 7:
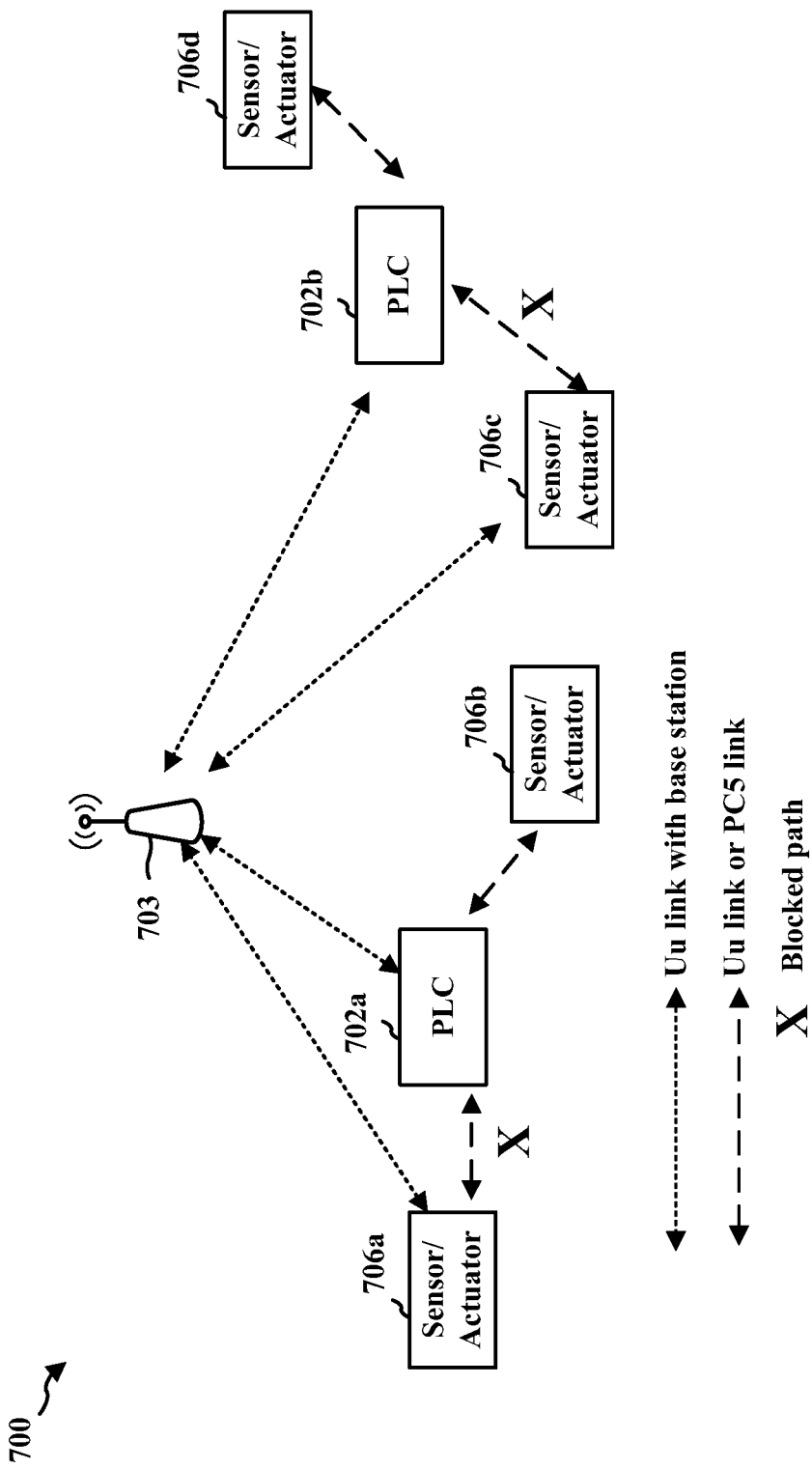
FIG. 7 illustrates example aspects of a wireless communication system including a base station, a PLC, and sensor(s/actuators).

FIG. 7 illustrates a communication system 700 that includes PLCs 702a and 702b, multiple sensors/actuators 706a, 706b, 706c, 706d, and a base station 703. In FIG. 7, the transmission path between PLC 702a and sensor/actuator 706a is blocked, and the transmission path between PLC 702b and sensor/actuator 706c is blocked. In FIG. 7, the PLC 702a may transmit a first transmission, e.g., based on SPS scheduling, directly to sensor/actuators 706a and 706b. The PLC 702b may transmit a first transmission to sensor/actuators 706c and 706d. The first transmission may be transmitted by the PLCs directly to the sensor/actuators using sidelink as described in connection with FIG. 6A or as a downlink signal as described in connection with FIG. 6B. If a first transmission from a PLC is not accurately received by sensor/actuator, the base station 703 may send a retransmission. The base station may receive the first transmission from the PLC and may receive feedback or a request for retransmission from the sensor/actuator. In response to the feedback or request for retransmission, the base station 703 may retransmit the first transmission that was initially transmitted by the PLC. For example, the base station 703 may receive the first transmission that is sent by the PLC 702a to the sensor/actuators 706a and sensor/actuator 706b. As the transmission path between the PLC 702a and sensor/actuator 706a is blocked, the sensor/actuator 706a may send HARQ feedback, such as a NACK, or may request a retransmission. The base station may receive the NACK or the retransmission request from the sensor/actuator 706a and may retransmit the first transmission that the base station received from the PLC 702a as a downlink transmission to the sensor/actuator 706a. Similarly, the base station 703 may provide a retransmission for sensor/actuator 706c for the first transmission from the PLC 702b. A retransmission may be based on scheduling from the respective PLC. The retransmission may be based on PDCCH scheduling from the base station.

Although aspects are described for a base station retransmission of a first transmission from a PLC to the sensor/actuator, aspects may similarly be applied to missed transmissions from a sensor/actuator to a PLC. Thus, if a PLC does not correctly receive an uplink/sidelink transmission from a sensor actuator, the PLC may send a NACK or a request for retransmission that is received by the base station. The base station may respond by sending a retransmission of the uplink/sidelink transmission from the sensor/actuator as a downlink transmission from the base station to the PLC.

The communication system may have reduced latency because the first transmission may be provided directly from the PLC 702a or 702b to the corresponding sensor/actuator 706a-d and may also be received by the base station 703 so that the base station can provide a retransmission. The communication system also provides improved reliability through the retransmission from the base station. A base station 703 may be positioned at a height or location that provides better coverage than the PLC 702a or PLC 702b. The base station 703 may provide an elevated transmission/reception point across PLCs. Therefore, a reduced number of transmission/reception points may be deployed for each PLC. The base station 703 may coordinate retransmissions to different sensors/actuators or UEs across the PLCs 702a, 702b, etc.

In some examples, a blocked transmission may be identified based on a previous transmission failure between a PLC and a sensor/actuator or a pattern of previous failures between the PLC and the sensor/actuator. Thus, a PLC-sensor/actuator link may be determined to be more prone to failure or to have a lower quality for data transmission. The first transmission for the sensor/actuator may be transmitted using reserved resources that enable the base station 703 to also decode the first transmission. For example, the base station 703 may reserve time and/or frequency resources for data from a PLC for a sensor/actuator such as between PLC 702a and sensor/actuator 706a.

Figure 8:
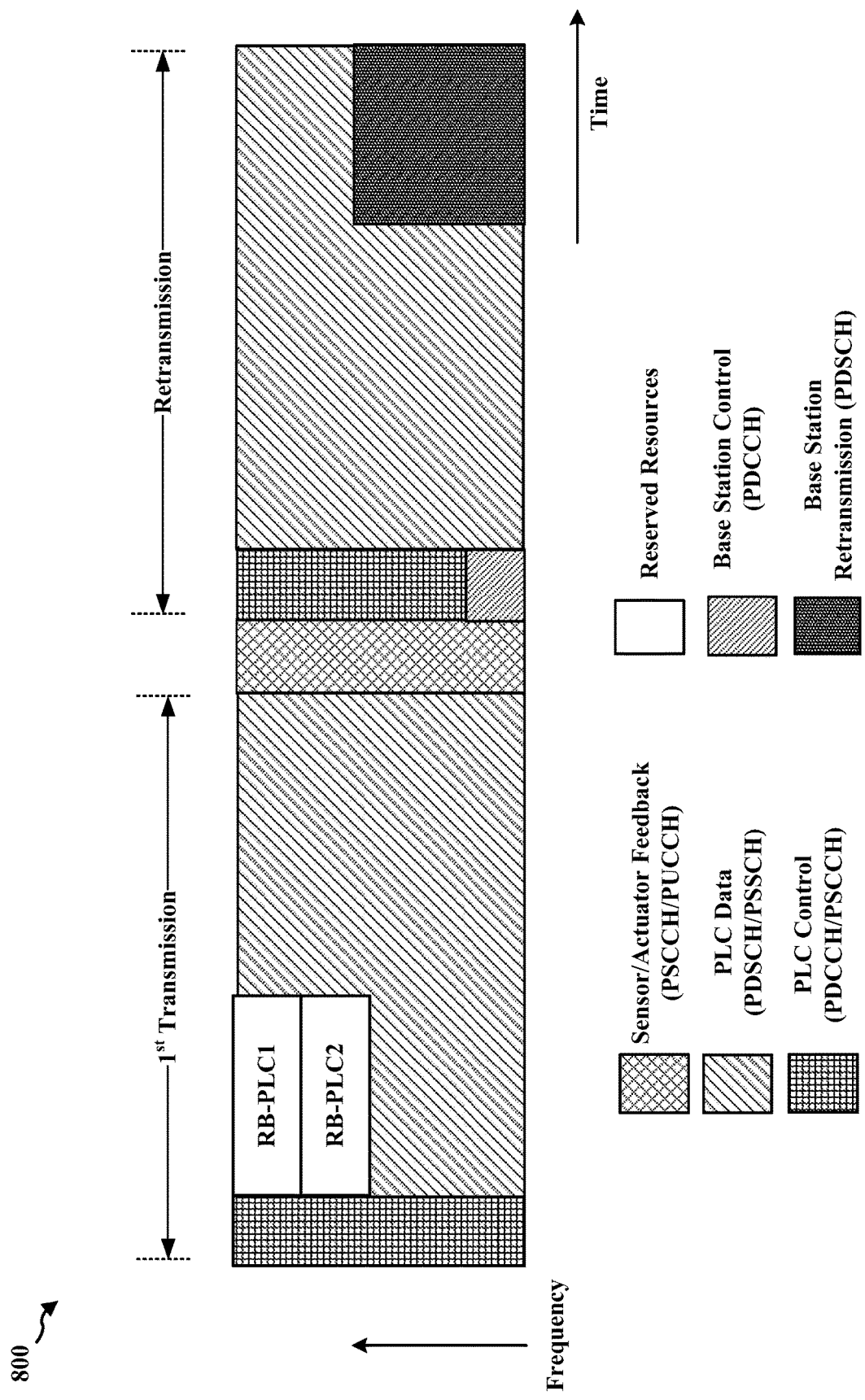
FIG. 8 illustrates an example of resources for a communication system including a base station, PLCs, and sensors/actuators.

FIG. 8 illustrates an example of resources 800 for communication involving a base station (such as base station 703) retransmission of a first transmission that is initially transmitted from a PLC (such as PLC 702a) and a sensor/actuator (such as sensor/actuator 706a). FIG. 8 illustrates resources for PDCCH or PSCCH from the PLC to the sensor/actuator for scheduling data, e.g., PDSCH or PSSCH from the PLC to the sensor/actuator. In other examples, the data transmission may be based on SPS. As illustrated in FIG. 8, the PLC may use reserved resources to transmit the data, such as resources reserved by the base station 703 that are not used for downlink transmissions or other uplink reception by the base station. This enables the base station to receive the data and to be ready to retransmit the data is the sensor/actuator sends HARQ feedback (such as a NACK or a lack of an ACK) or a request for retransmission. This example may be referred to as a proactive base station retransmission.

The sensor/actuator (e.g., sensor/actuator 706a) may transmit the NACK or request for retransmission using an increased transmission power to help ensure that the base station receives the NACK and is informed about the requested retransmission. For example, the sensor/actuator 706a may use a maximum of an uplink power to the PLC 702a and uplink power to the base station 703 to send a NACK.

The base station 703 may reserve multiple resources for data transmissions from different PLCs. For example, FIG. 8 illustrates resources reserved for PLC1 (e.g., PLC 702a) and resources reserved for PLC2 (e.g., PLC 702b). The resources may be reserved based on a likelihood of failure for first transmissions between the PLC and the respective sensor/actuator. For example, the base station may reserve resources for transmissions between a PLC and a sensor/actuator that are likely to fail or have a history of failure. The base station may resource orthogonal resources. The base station may measure a channel between the base station and the PLCs and may reserve orthogonal resources for PLCs that may have a stronger measured interference at the base station 703. The resources used by the base station to retransmit the data from the PLC for the sensor/actuator may also be reserved by the base station.

Different bandwidth parts (BWPs) may be used for transmissions between the PLC 702a and the base station 703 than used between the PLC 702a and the sensor/actuator 706a. In a first example, the PLC 702a may transmit the first data transmission in both a first BWP used with the base station 703 and in a second BWP used with the sensor/actuator 706a. In some examples, the two transmissions in the different BWPs may overlap in time. In a second example, the PLC 702a may transmit the first transmission of the data to the sensor/actuator 706a in the BWP of the base station 703. This may enable the base station 703 to receive the transmission and be ready for retransmission without requiring an additional transmission by the PLC 702a. In a third example, the PLC 702a may transmit the first transmission of the data to the sensor/actuator 706a in the BWP of the sensor/actuator or UE, which is also intended for reception by the base station 703. This may enable the base station 703 to receive the transmission and be ready for retransmission without requiring an additional transmission by the PLC 702a.

The PLC (e.g., PLC 702a) may apply transmission power control to enable the data transmitted to the base station 703, such as in the reserved resources, to be received by the base station 703. Thus, the PLC 702a may use a different transmit power for a transmission of data for a sensor/actuator 706a that is intended for reception by a base station 703.

The sensor/actuator may be aware of whether the retransmission is being provided by the PLC and/or the base station. For example, the retransmission may be scheduled using PDCCH from the base station and/or using PDCCH/PSCCH from the PLC. For example, FIG. 8 illustrates the retransmission period beginning with PDCCH from the base station and PDCCH/PSCCH from the PLC that may schedule the respective resources of the retransmission.

Figure 9:
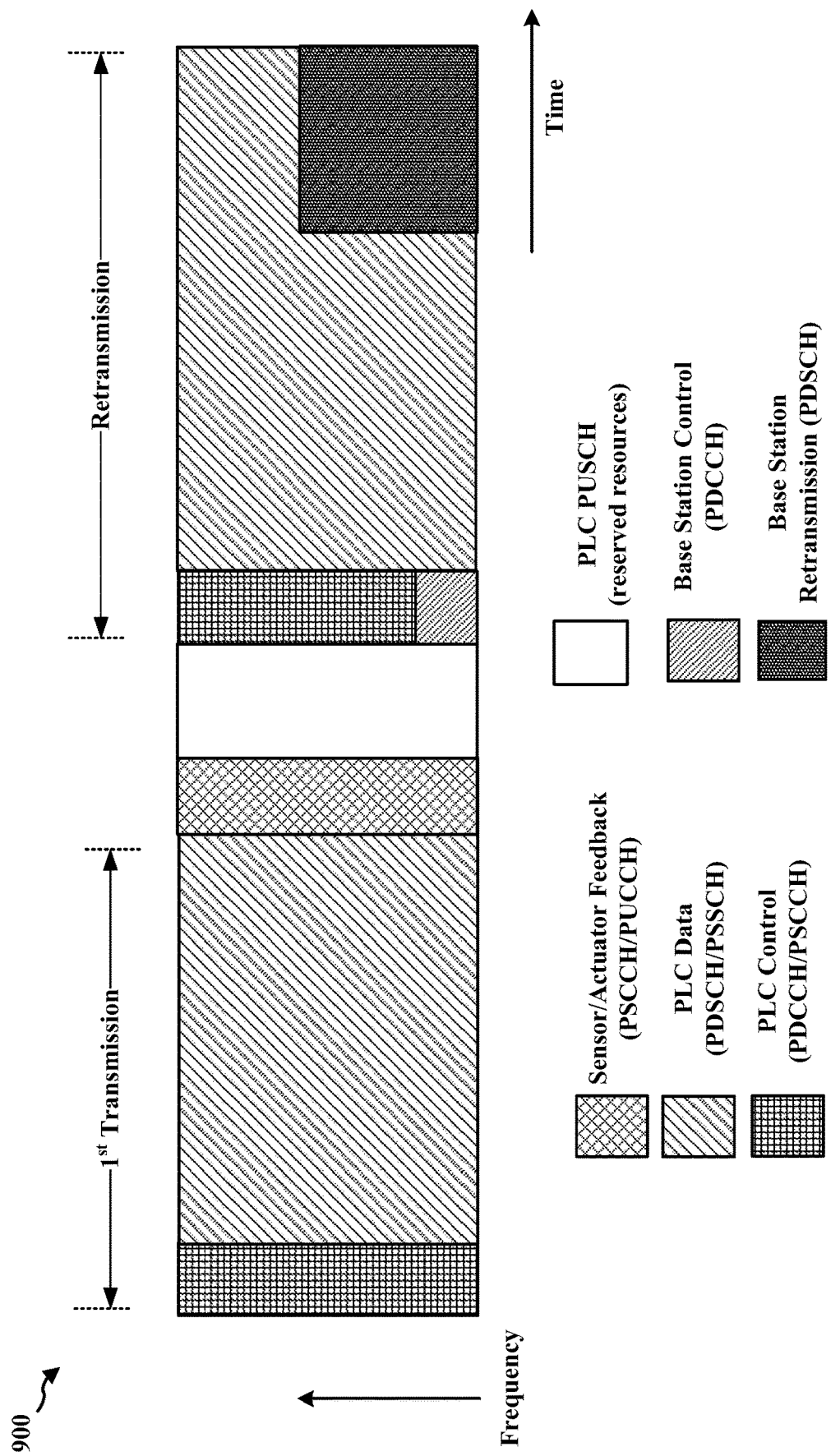
FIG. 9 illustrates an example of resources for a communication system including a base station, a PLC, and sensor(s)/actuator(s).

FIG. 9 illustrates an example of resources 900 in which a base station 703 may receive a transmission of the data in an uplink transmission from the PLC (e.g., PLC 702a) after a NACK from the sensor/actuator (e.g., sensor/actuator 706a) in order to retransmit the data to the sensor/actuator 706a. Thus, if a first transmission from a PLC to a sensor/actuator fails, the PLC 702a may respond by sending the data transmission in an uplink transmission (e.g., PUSCH) to the base station 703, and the base station 703 may subsequently forward the retransmission to the sensor/actuator 706a. The PLC 702a may transmit the data to the base station 703 using reserved resources so that the base station can receive the retransmission. The reserved resources may be orthogonal across different PLCs. The reserved resources may be based on SPS. The base station may transmit the retransmission to the sensor/actuator 706a using reserved retransmission resources. The first transmission from the PLC to the sensor/actuator may be scheduled based on SPS or based on PDCCH/PSCCH.

This example in FIG. 9 may be referred to as a reactive base station transmission. Aspects of the reactive base station transmission example may be applied, e.g., if a channel quality between a sensor/actuator and a PLC has not been determined, or predicted, to be low. For example, if past transmissions have been successful and/or if a measured link quality is above a threshold, the base station may provide a retransmission based on the reactive aspects of FIG. 9 rather than the proactive aspects of FIG. 8.

The base station 703 may send the retransmission to a target sensor/actuator 706a using reserved retransmission resources. As the PLC 702a may also provide a retransmission, control and data transmissions may be multiplexed for the PLC and the base station, as illustrated in FIG. 9.

Although the example has been provided for a failure of a transmission from a PLC 702a to a sensor/actuator 706a, the concepts presented herein may also be applied to first transmissions from a sensor/actuator 706a to a PLC 702a. For example, the base station 703 may receive a first transmission from the sensor/actuator 706a that is not received by the PLC 702a due to the blocked transmission path. The PLC 702a may provide HARQ feedback (such as a NACK or the absence of an ACK) or a request for a retransmission to the sensor/actuator 706a and/or the base station 703. The base station 703 may respond to the HARQ feedback or the request for a retransmission by sending a retransmission of the sensor/actuator's transmission to the PLC 702a.

The base station 703 may send the retransmission to the PLC 702a using reserved retransmission resources. As the sensor/actuator 706a may also provide a retransmission, control and data transmissions and retransmissions may be multiplexed for the PLC and the sensor/actuator.

Figure 10:
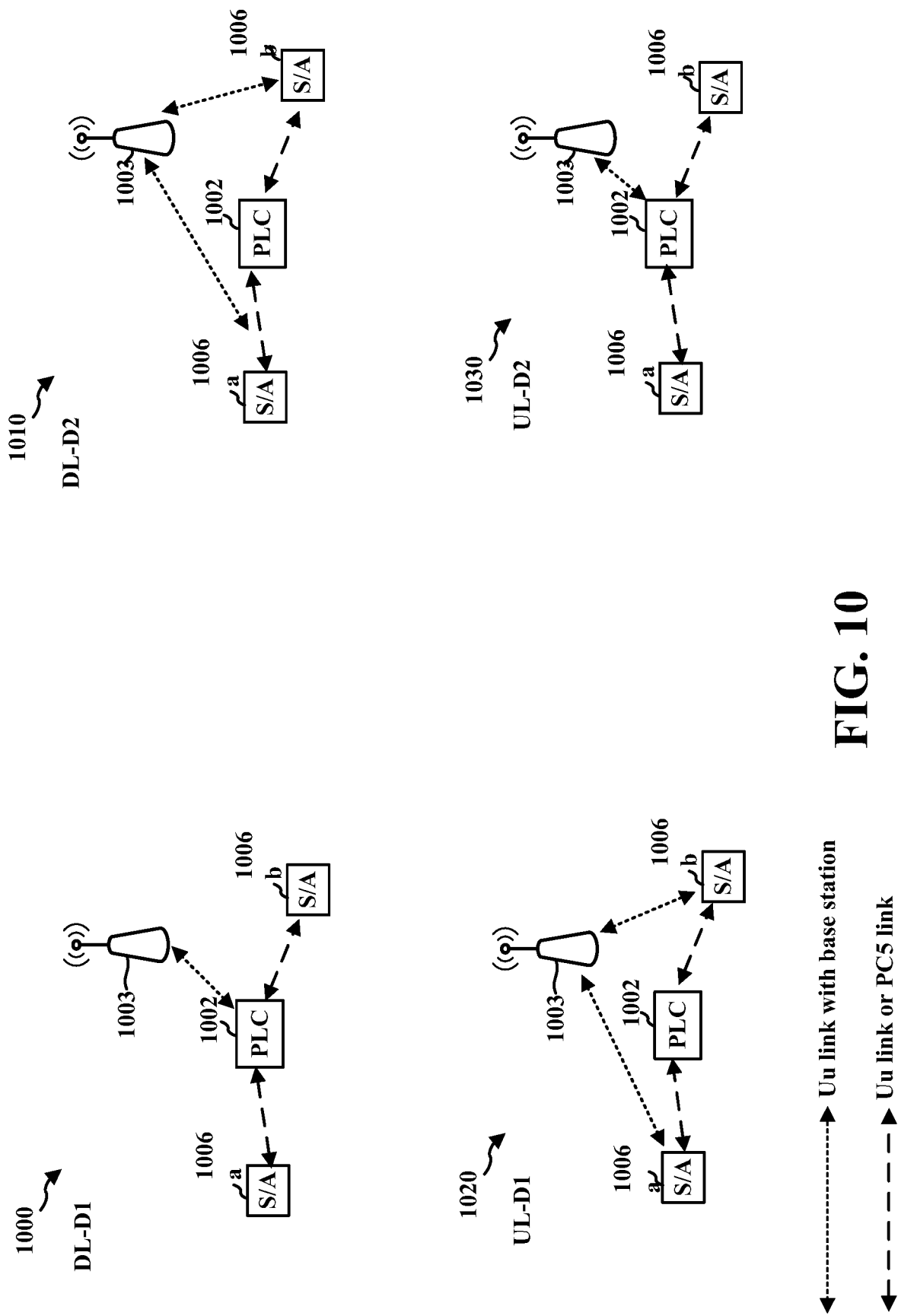
FIG. 10 illustrates example aspects of phases of communication in a wireless communication system including a base station, a PLC, and sensor(s)/actuator(s).

FIG. 10 illustrates four example phases of traffic that may be exchanged between a base station 1003, a PLC 1002, and sensors/actuators 1006a and 1006b. The PLC 1002 may correspond to the PLC 702a or 702b. The sensor/actuator 1006a and 1006b may correspond to sensor/actuator 706a, 706b, 706c, 706d. The communication may have a reliability on the order of $10^{-4}$. In a first example 1000, the PLC 1002 may transmit a first transmission to the sensor/actuators 1006a and 1006b and to the base station 1003. The first example 1000 may be referred to as the "DL-D1" phase. The first transmission may include a downlink transmission, e.g., a PDSCH transmission. In another example, the first transmission may be based on sidelink, e.g., a PSSCH transmission. The first transmission may be based on SPS.

In the second example 1010, the base station 1003 may retransmit the transmission, which was initially transmitted by the PLC 1002, to the sensor/actuators 1006a and 1006b. The retransmission may be sent in response to HARQ feedback or a request for retransmission from the sensor/actuators 1006a and 1006b. In another example, the retransmission may be in response to a request from the PLC 1002. The second example 1010 may be referred to as the "DL-D2" phase. The retransmission may be sent as PDSCH. The retransmission may be scheduled by PDCCH from the base station 1003 or PDCCH/PSCCH from the PLC.

In the third example 1020, the sensor/actuators 1006a and 1006b may transmit an initial uplink transmission to the PLC 1002, which may also be received by the base station 1003. The third example 1020 may be referred to as the "UL-D1" phase. The first transmission may include a uplink transmission, e.g., a PUSCH transmission. In another example, the first transmission may be based on sidelink, e.g., a PSSCH transmission. The first transmission may be based on SPS.

In the fourth example 1030, the base station 1003 may retransmit the transmission, which was initially transmitted by the sensor/actuators 1006a and 1006b, to the PLC 1002. The fourth example 1030 may be referred to as the "UL-D2" phase. The retransmission may be sent in response to HARQ feedback or a request for retransmission from the sensor/actuators from the PLC 1002. The retransmission may be sent as PDSCH. The retransmission may be scheduled by PDCCH from the base station 1003 or PDCCH/PSCCH from the PLC.

Figure 11:
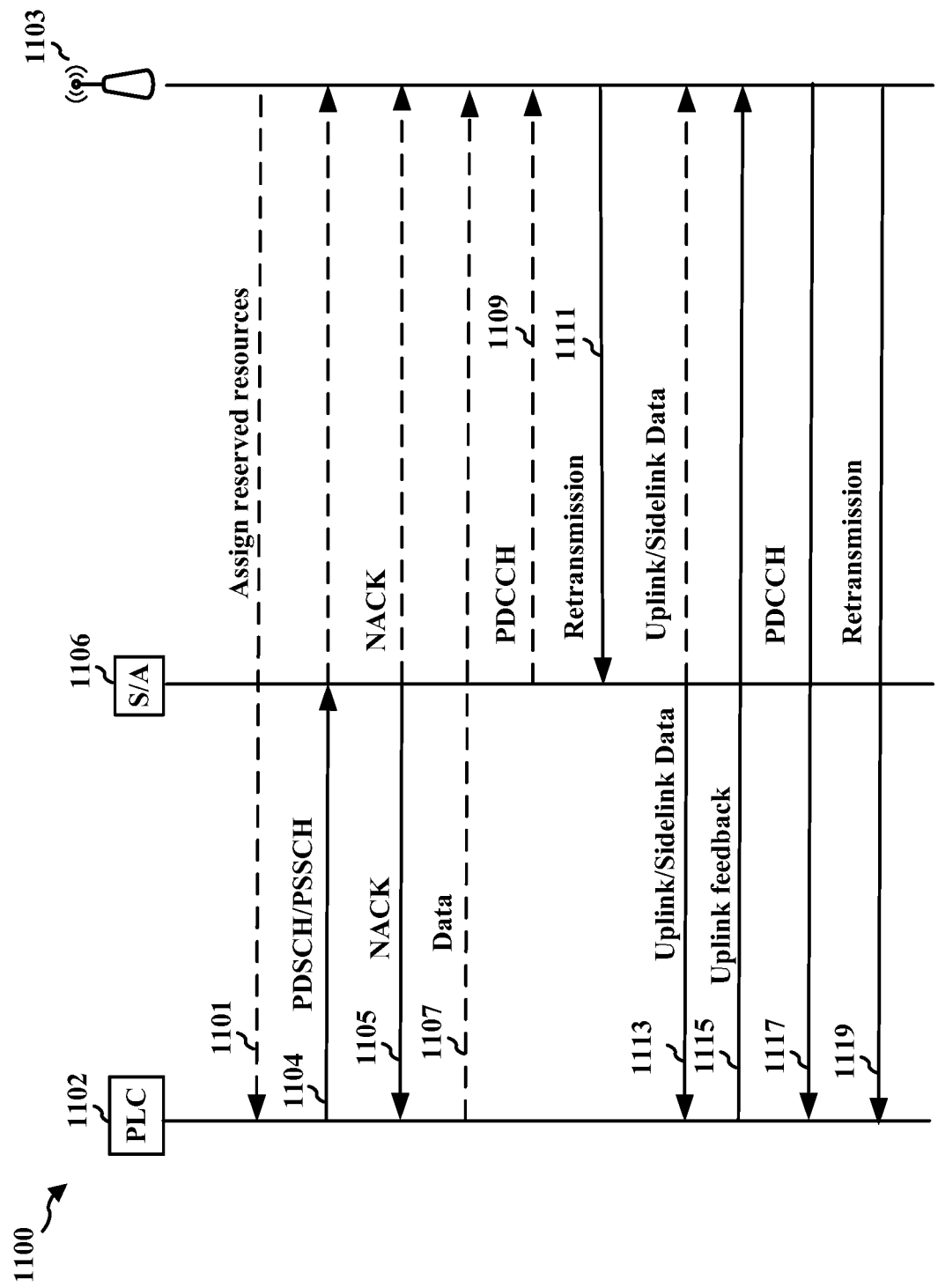
FIG. 11 illustrates an example communication flow between wireless devices.

FIG. 11 illustrates an example communication flow 1100 between a PLC 1102, a sensor/actuator 1106, and a base station 1103. The PLC 1102 may correspond to the PLC 702a or 702b. The sensor(s)/actuator(s) 1106 may correspond to sensor/actuator 706a or 706c, for example. The base station 1103 may correspond to the base station 703.

The PLC 1102 may transmit data 1104 to the sensor/actuator 1106, as PDSCH or PSSCH. The data 1104 may also be received by the base station 1103, e.g., such as described in connection with FIG. 8. The data may be transmitted using reserved resources, which may be assigned in 1101. The sensor/actuator 1106 may provide feedback 1105, e.g., HARQ feedback or a request for retransmission, to the PLC 1102 and/or the base station 1103. In a proactive feedback example, such as in FIG. 8, the base station may receive the feedback 1105 from the sensor/actuator 1106 and may retransmit the data in the retransmission 1111 (e.g., PDSCH). In the reactive example of FIG. 9, the PLC may transmit the data 1107 in an uplink transmission to the base station in response to receiving the feedback 1105 from the sensor/actuator 1106. The transmission of the data 1107 may trigger the base station to provide the retransmission 1111 to the sensor/actuator. In some examples, the base station 1103 may send a control channel 1109, e.g., PDCCH, scheduling the retransmission 1111.

The sensor/actuator 1106 may transmit data 1113 to the PLC 1102, as PUSCH or PSSCH. The data 1113 may also be received by the base station 1103. Although not illustrated, the PLC 1102 may provide feedback, e.g., HARQ feedback or a request for retransmission, to the sensor/actuator 1106. The PLC 1102 may provide feedback 1115, e.g., HARQ feedback or a request for retransmission, to the base station 1103. The feedback 1115 may be transmitted using resources assigned by the base station in an assignment transmission 1101 to the PLC 1102. In response, the base station 1103 may transmit a retransmission 1119 of the uplink/sidelink data transmission 1113 that was initially transmitted by the sensor/actuator 1106. Although not illustrated, the sensor/actuator 1106 may also send a retransmission, e.g., as an uplink retransmission or a sidelink retransmission to the PLC 1102. In some examples, the base station 1103 may send a control channel 1117, e.g., PDCCH, scheduling the retransmission 1119.

Figure 12:
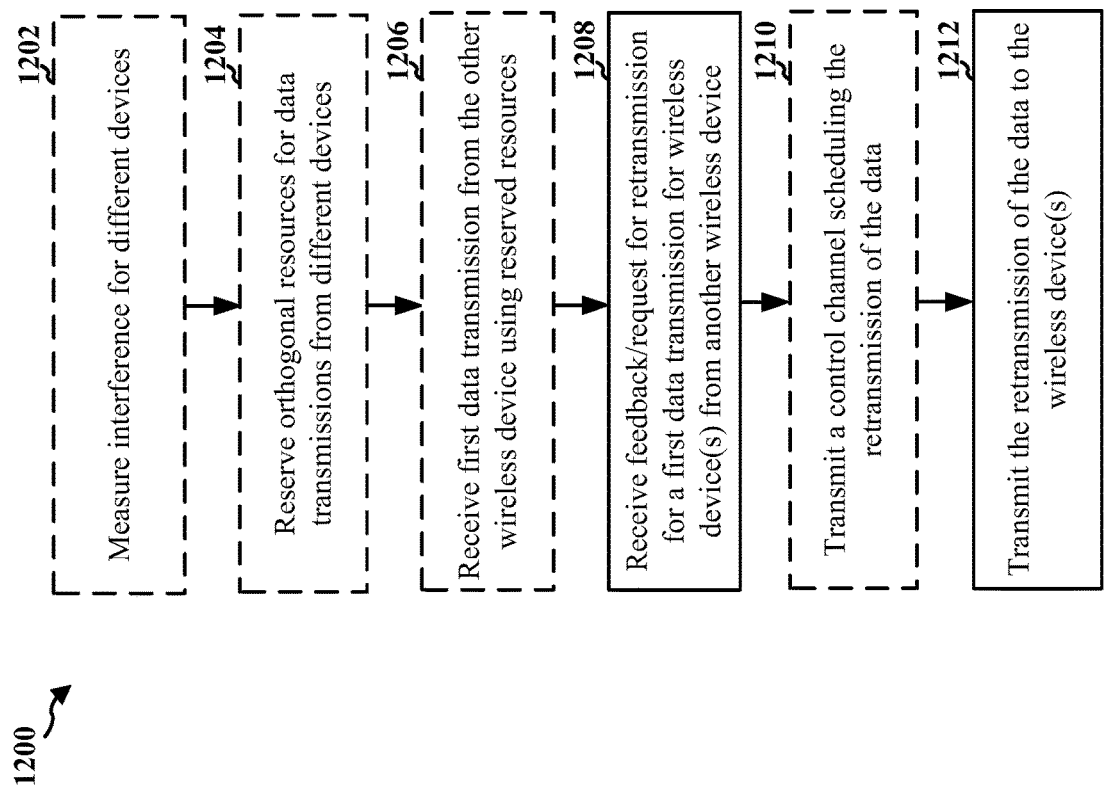
FIG. 12 is a flowchart of a method of wireless communication.

FIG. 12 is a flowchart 1200 of a method of wireless communication. The method may be performed by a base station or a component of a base station (e.g., the base station 102, 180, 310, 403, 603, 703, 1103; the apparatus 1302/1302'; a processing system 1414, which may include the memory 376 and which may be the entire base station 310 or a component of the base station 310, such as the TX processor 316, the RX processor 370, and/or the controller/processor 375). Optional aspects are illustrated with a dashed line. The method may help improve reliability and/or latency of wireless communication involving a device that receives uplink communication from other wireless devices and that receives downlink communication from a base station. For example, the method may help improve reliability and/or latency of IIoT devices, such as a PLC or sensor/actuator, while also improving the efficient use of wireless resources.

At 1208, the base station receives feedback for a first data transmission or an indication to retransmit a first data transmission, the first data transmission being transmitted to at least one wireless device from another wireless device. The at least one wireless device may include at least one sensor or actuator (e.g., any of sensor/actuator 406, 606a, 606b, 606c, 606d, 706a, 706c, 1106, equipment 404). The other wireless device that transmits the first data may include a PLC (e.g., any of PLC 402, 602, 602a, 602b, 702a, 702b, 1102). The feedback or indication may be received, e.g., by the feedback component 1308 of the apparatus 1302 in FIG. 13.

The feedback, e.g., at 1208, may include HARQ feedback (such as a NACK) received in an uplink control channel (e.g., PUCCH) from the at least one wireless device. For example, FIG. 11 illustrates an example of a NACK, e.g., feedback 1105, from a sensor/actuator 1106 that may be received by the base station 1103. As illustrated at 1206, the base station may receive the first data transmission from the other wireless device. The data may be received, e.g., by the data component 1310 of the apparatus 1302 in FIG. 13. The first data transmission may be received using reserved resources in one or more of time or frequency. FIG. 8 illustrates example aspects of reserved resources for receiving a data transmission. As illustrated at 1204, the base station may reserve orthogonal resources for data transmissions from different devices. The reservation may be performed, e.g., by the feedback component 1308 of the apparatus 1302 in FIG. 13. FIG. 8 illustrates different reserved resources for data transmissions from different PLCs. As illustrated at 1202, the base station may measure interference for the different devices, and the orthogonal resources may be reserved based on the measured interference. The measurement may be performed, e.g., by the measurement component 1316 of the apparatus 1302 in FIG. 13. For example, the base station may reserve orthogonal resources for PLCs that will have a strong interference at the base station. The base station may use a different BWP than the other wireless device uses for transmissions to the at least one wireless device, e.g., the base station may use a different BWP that the sensor/actuators. In some examples, the first data transmission may be received, at 1206, in a BWP of the base station. Thus, the reserved resources may be in a BWP of the base station. For example, a PLC may transmit the data in both BWPs or may send the data transmission in the BWP of the base station. In other examples, the first data transmission may be received, at 1206 in a BWP used by the other wireless device to transmit the first data transmission to the at least one wireless device, e.g., a sensor/actuator. Thus, the reserved resources may be in a BWP used with the at least one wireless device.

The base station may receive, at 1208, the indication to retransmit the first data transmission from the other wireless device. The indication may include an uplink transmission of the first data transmission from the other wireless device, such as described in connection with FIG. 9. The reception may be performed, e.g., by the data component 1310 of the apparatus 1302 in FIG. 13. FIG. 11 illustrates an example, in which the receipt of data 1107 may trigger the base station 1103 to provide a retransmission of the data to a sensor/actuator 1106. The base station may receive the first data transmission from the other wireless device using first reserved resources, and may transmit the retransmission of the first data transmission using second reserved resources, such as described in connection with the examples in FIG. 8 and/or FIG. 9. The base station may reserve orthogonal resources for data transmissions from different devices. The reservation may be performed, e.g., by the reservation component 1318 of the apparatus 1302. The reserved resources may be based on semi-persistent scheduling.

At 1212, the base station transmits, in response to the feedback or the indication, a retransmission of the first data transmission in a downlink transmission to the at least one wireless device. The retransmission may be performed, e.g., by the retransmission component 1312 of the apparatus 1302 in FIG. 13. The retransmission of the first data transmission may be multiplexed with a second data transmission from the other wireless device, such as illustrated in FIG. 8 and/or FIG. 9. As illustrated at 1210, the base station may transmit a first control channel to the at least one wireless device scheduling the retransmission of the first data transmission. The transmission of the control channel may be performed, e.g., by the control component 1314 of the apparatus 1302 in FIG. 13. The control channel may overlap in time with a second control channel from the other wireless device scheduling the second data transmission, such as illustrated in FIG. 8 and FIG. 9.

Figure 13:
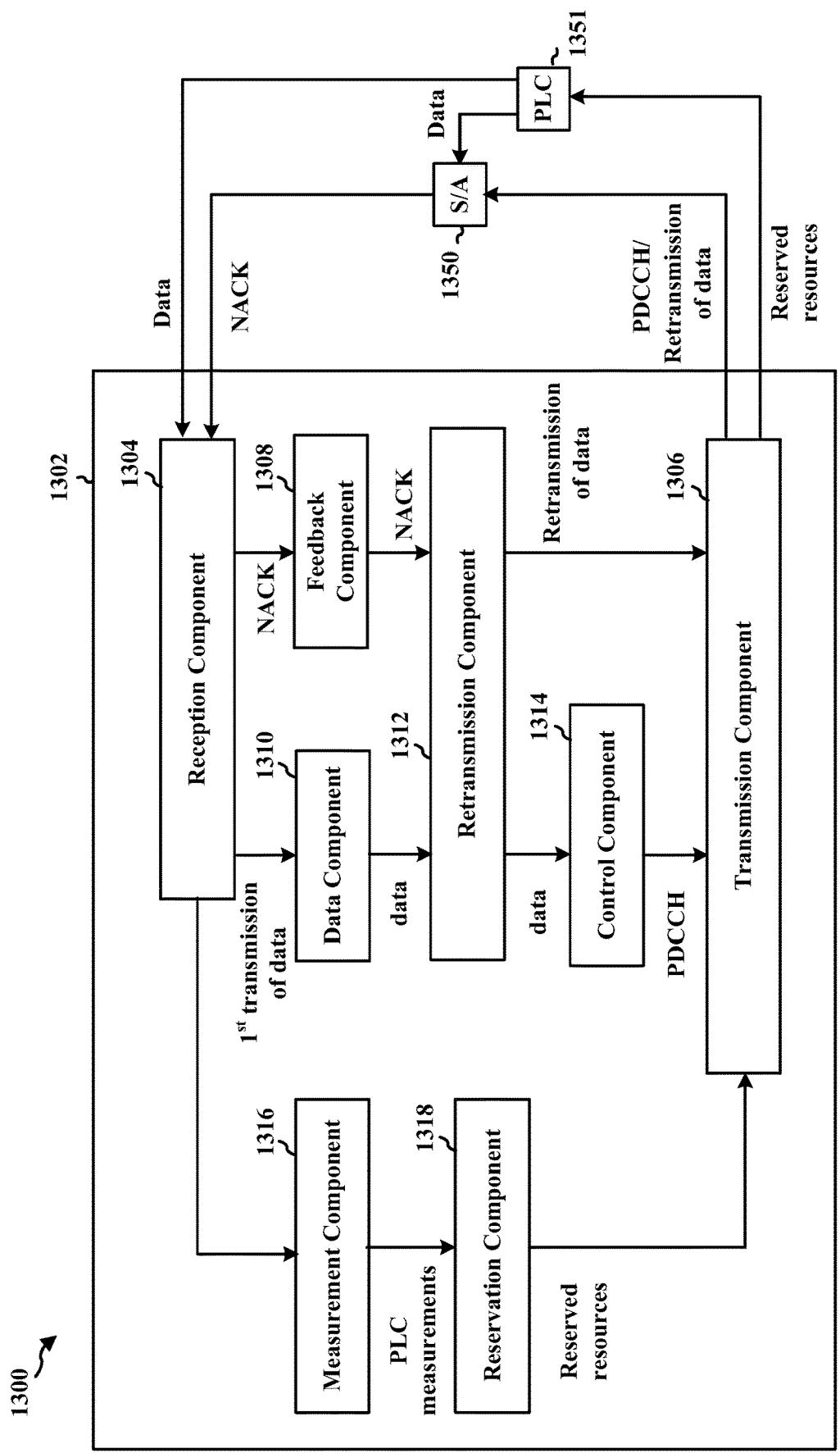
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station or a component of a base station (e.g., base station 102, 180, 310, 403, 603, 703, 1103). The apparatus 1302 includes a reception component 1304 that receives uplink communication from wireless devices 1350 and 1351, which may be a PLC or sensor/actuator. The apparatus 1302 includes a transmission component 1306 configured to transmit downlink communication to the wireless devices 1350 and 1351. The apparatus 1302 includes a feedback component 1308 configured to receive feedback for a first data transmission or an indication to retransmit a first data transmission, the first data transmission being transmitted to at least one wireless device from another wireless device, e.g., as described in connection with 1208 in FIG. 12. The apparatus 1302 may include a retransmission component 1312 configured to transmit, in response to the feedback or the indication, a retransmission of the first data transmission in a downlink transmission to the at least one wireless device, e.g., as described in connection with 1212 in FIG. 12. The apparatus 1302 may include a data component 1310 configured to receive the first data transmission from the other wireless device using reserved resources in one or more of time or frequency, e.g., as described in connection with 1206 in FIG. 12. The apparatus 1302 may include a reservation component 1318 configured to reserve orthogonal resources for data transmissions from different devices, e.g., as described in connection with 1204 in FIG. 12. The apparatus 1302 may include a measurement component 1316 configured to measure interference for the different devices, where the orthogonal resources are reserved based on the measured interference, e.g., as described in connection with 1202 in FIG. 12. The apparatus 1302 may include a control component 1314 configured to transmit a first control channel to the at least one wireless device scheduling the retransmission of the first data transmission, e.g., as described in connection with 1210 in FIG. 12. The control channel may overlap in time with a second control channel from the other wireless device scheduling the second data transmission.

The apparatus may include additional components that perform each of the blocks of the algorithm in the aforementioned flowchart of FIG. 12 and the aspects performed by the base station as described in FIGS. 7-11. As such, each block in the aforementioned flowchart of FIG. 12 and the aspects performed by the base station as described in FIGS. 7-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
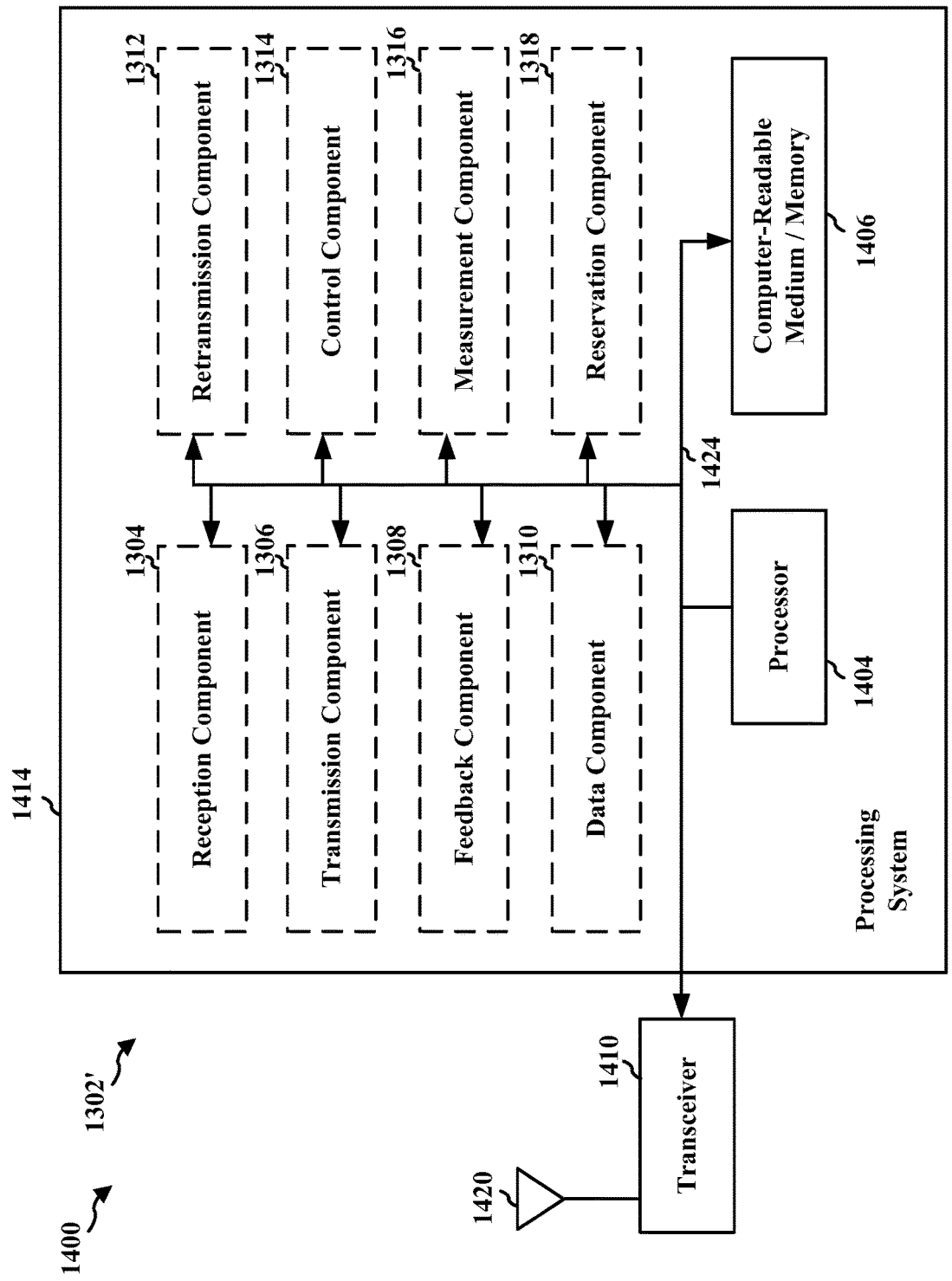
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for receiving feedback for a first data transmission or an indication to retransmit a first data transmission, the first data transmission being transmitted to at least one wireless device from another wireless device and means for transmitting, in response to the feedback or the indication, a retransmission of the first data transmission in a downlink transmission to the at least one wireless device. The apparatus may further include means for receiving the first data transmission from the other wireless device using reserved resources in one or more of time or frequency. The apparatus may further include means for reserving orthogonal resources for data transmissions from different devices. The apparatus may further include means for measuring interference for the different devices, where the orthogonal resources are reserved based on the measured interference. The apparatus may further include means for receiving the first data transmission from the other wireless device using first reserved resources, where the apparatus transmits the retransmission of the first data transmission using second reserved resources. The apparatus may further include means for reserving orthogonal resources for data transmissions from different devices. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
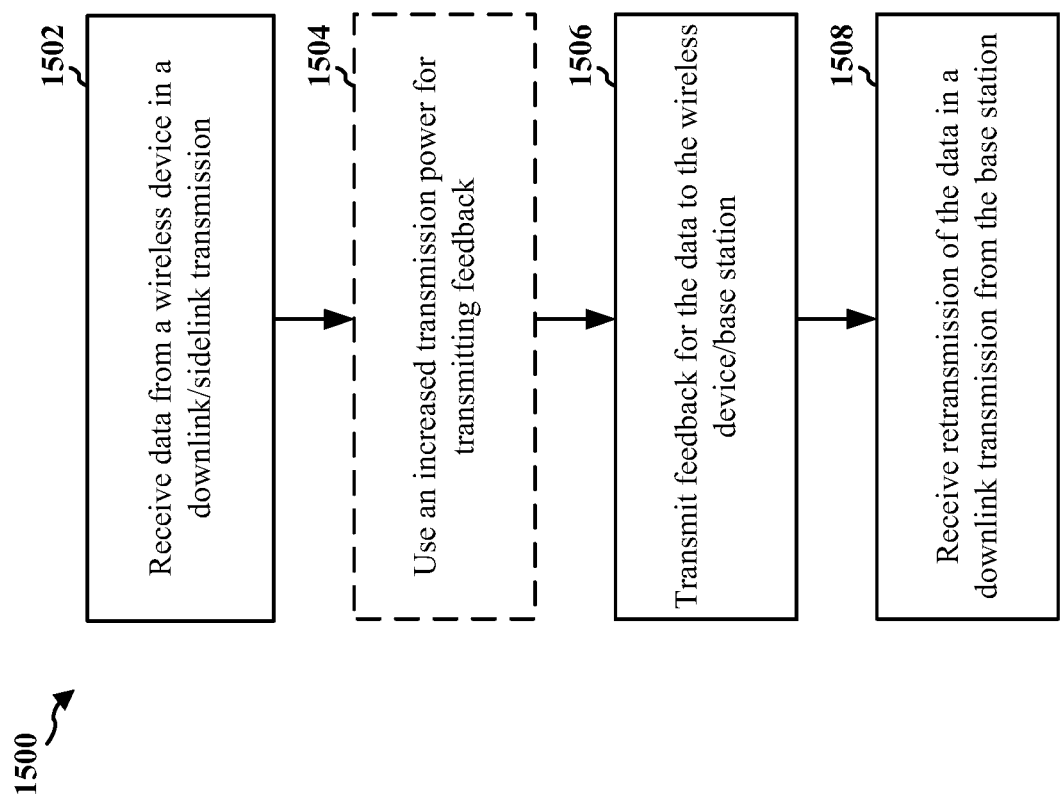
FIG. 15 is a flowchart of a method of wireless communication.

FIG. 15 is a flowchart 1500 of a method of wireless communication. The method may performed by a sensor, an actuator, a user equipment, or a component thereof (e.g., any of sensor/actuator 406, 606a, 606b, 606c, 606d, 706a, 706c, 1106; equipment 404; the apparatus 1602/1602'; a processing system 1714, which may include the memory 360 and which may be the entire wireless device or a component of the wireless device, such as the TX processor 368, the RX processor 356, and/or the controller/processor 359). Optional aspects are illustrated with a dashed line. The method may help improve reliability and/or latency of wireless communication for a device that receives downlink/sidelink communication from another wireless device such as a PLC by providing retransmission of missed data from a base station. For example, the method may help improve reliability and/or latency for devices, such as IIoT devices, while also improving the efficient use of wireless resources.

At 1502, the wireless device receives data from another wireless device in a downlink transmission or a sidelink transmission. The other wireless device may comprise a PLC (e.g., any of PLC 402, 602, 602a, 602b, 702a, 702b, 1002, 1102). For example, as described in connection with FIGS. 7-11, a sensor/actuator or a UE may receive data from a wireless device such as a PLC. The reception may be performed, e.g., by the data component 1608 of the apparatus 1602 in FIG. 16.

At 1506, the wireless device transmits feedback for the data to one or more of the wireless device or a base station. FIGS. 8-11 illustrate example aspects of a sensor/actuator providing feedback about a missed data transmission. The transmission may be performed, e.g., by the feedback component 1610 of the apparatus 1602 in FIG. 16.

As illustrated at 1504, the wireless device may use an increased transmission power for transmitting the feedback. The increased transmission power may be based on a first maximum transmission power for a transmission to the wireless device and/or a second maximum transmission power for an uplink transmission to the base station. A determination of the transmission power may be performed, e.g., by the power component 1612 of the apparatus 1602 in FIG. 16.

At 1508, the wireless device receives a retransmission of the data in a downlink transmission from the base station. FIGS. 8-11 illustrate examples of a sensor/actuator providing feedback about a missed data transmission. The reception may be performed, e.g., by the data component 1608 of the apparatus 1602 in FIG. 16.

Figure 16:
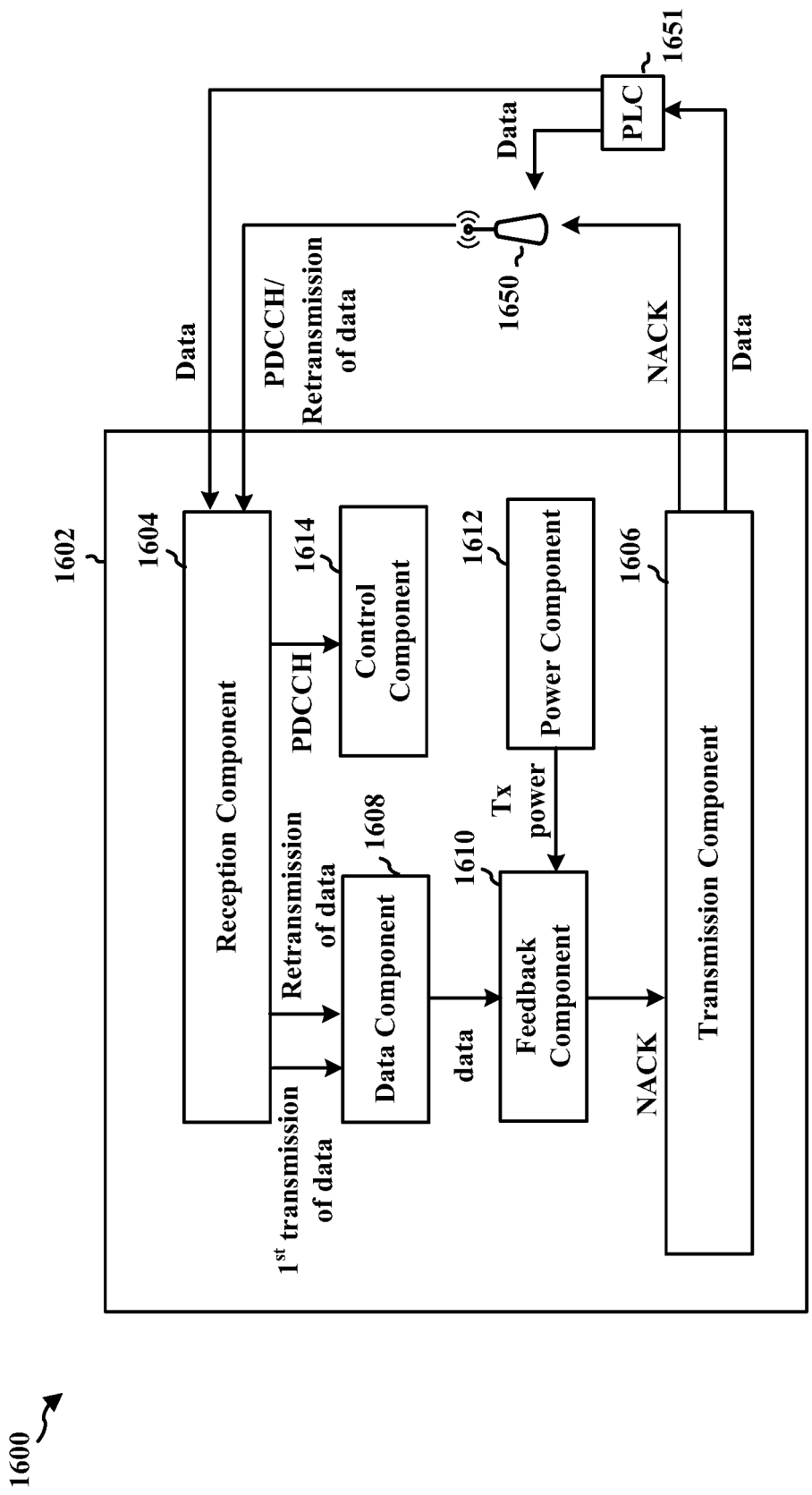
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a wireless device such as a sensor, and actuator, a UE, or a component thereof. The apparatus 1602 includes a reception component 1604 that receives downlink and/or sidelink communication. The apparatus 1602 includes a transmission component 1606 that transmits uplink and/or sidelink communication. The apparatus 1602 may include a data component 1608 configured to receive data from a wireless device in a downlink transmission or a sidelink transmission, e.g., as described in connection with 1502 in FIG. 15. The apparatus 1602 may include a feedback component 1610 configured to transmit feedback for the data to one or more of the wireless device 1651 or a base station 1650, e.g., as described in connection with 1506 in FIG. 15. The data component 1608 may be further configured to receive a retransmission of the data in a downlink transmission from the base station, e.g., as described in connection with 1508 in FIG. 15. The apparatus may include a power component 1612 configured to determine and/or use an increased transmission power for transmitting the feedback, e.g., as described in connection with 1504 in FIG. 15. The apparatus may further include a control component 1614 configured to receive a control channel scheduling the transmission or the retransmission of the data, e.g., such as described in connection with any of FIG. 8, 9, or 11.

The apparatus may include additional components that perform each of the blocks of the algorithm in the aforementioned flowchart of FIG. 15, as well as any of the aspects described in connection with the example sensors/actuators in FIGS. 7-11. As such, each block in the aforementioned flowchart of FIG. 15, as well as any of the aspects described in connection with the example sensors/actuators in FIGS. 7-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
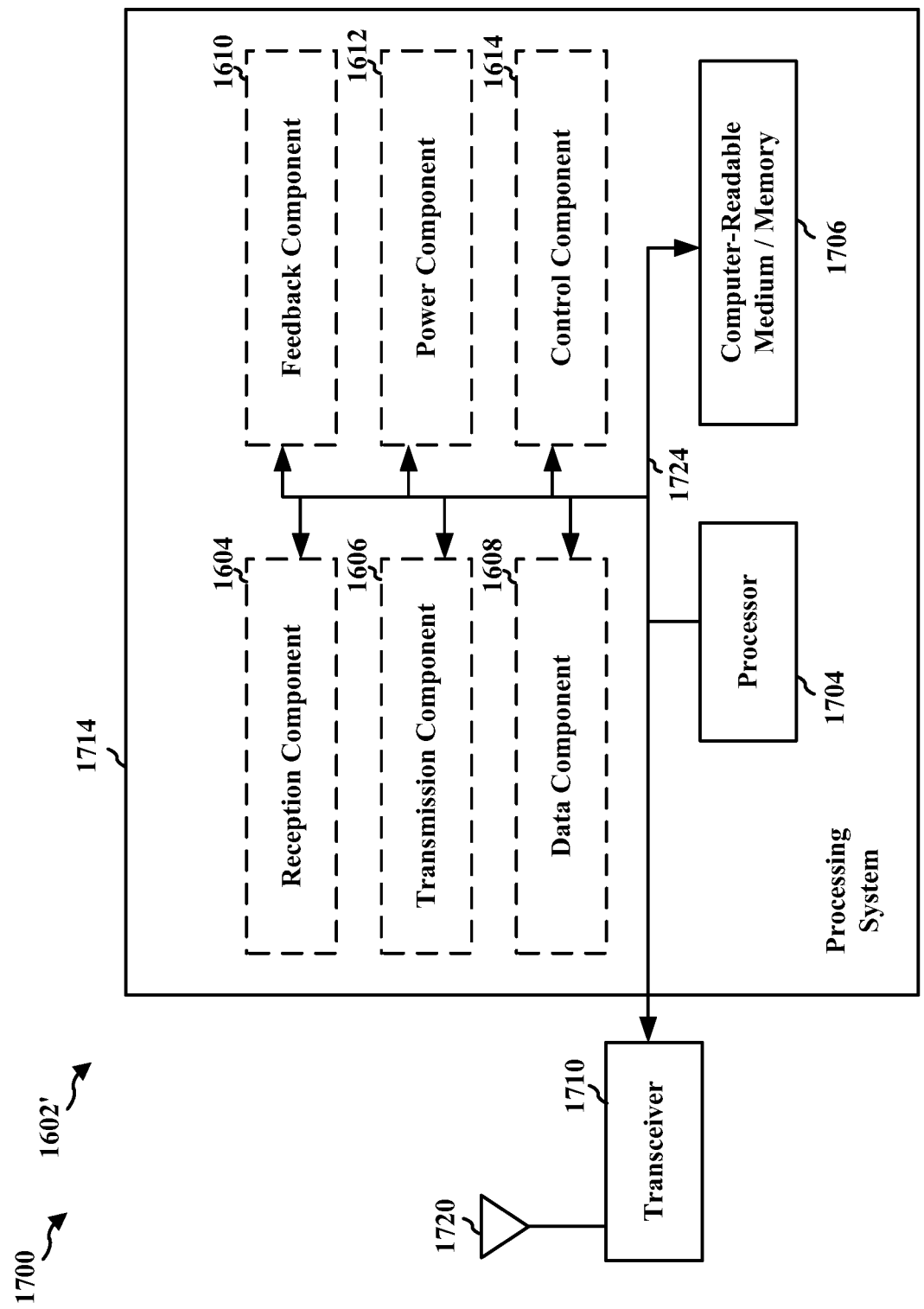
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612.

The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359. Alternatively, the processing system 1714 may be the entire UE (e.g., see 350 of FIG. 3).

In one configuration, the apparatus 1602/1602' for wireless communication includes means for receiving data from a wireless device in a downlink transmission or a sidelink transmission, means for transmitting feedback for the data to one or more of the wireless device or a base station, and means for receiving a retransmission of the data in a downlink transmission from the base station. The apparatus 1602/1602' may further include means for using an increased transmission power for transmitting the feedback. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
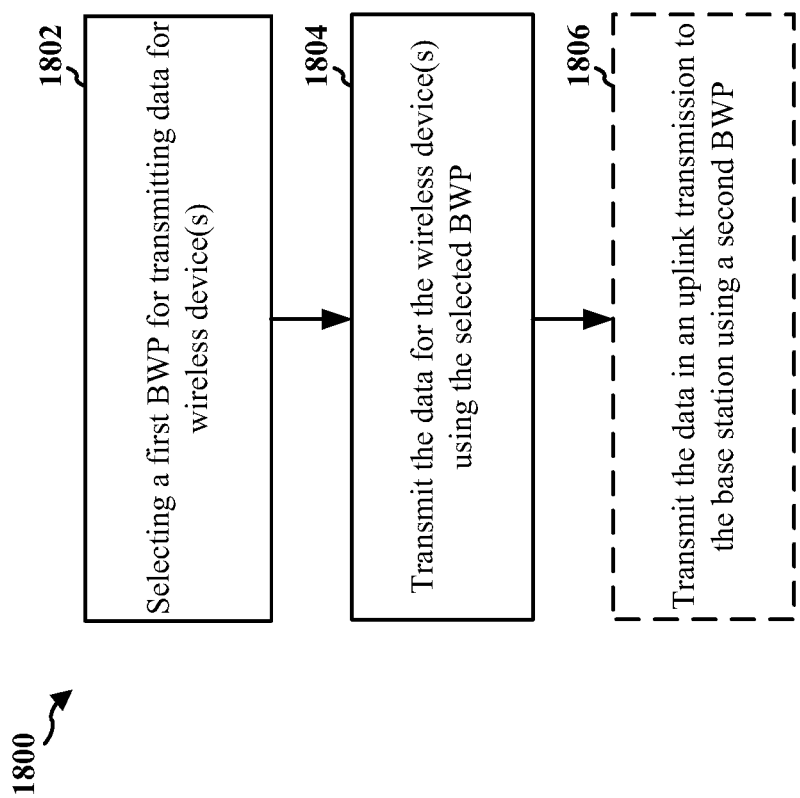
FIG. 18 is a flowchart of a method of wireless communication.

FIG. 18 is a flowchart 1800 of a method of wireless communication. The method may be performed by a wireless device that transmits downlink or sidelink communication to at least one wireless device and that communicates with a base station using a Uu link. For example, the method may be performed by a PLC or a component of a PLC (e.g., the PLC 145, 402, 602, 602*a*, 602*b*, 702*a*, 702*b*, 1002, 1102; the apparatus 2002/2002'; the device 350; a processing system 2114, which may include the memory 360 and which may be the entire PLC or a component of the PLC, such as the TX processor 368, the RX processor 356, and/or the controller/processor 359). Optional aspects are illustrated with a dashed line. The method may help improve reliability and/or latency of wireless communication for a device that receives uplink/sidelink communication from other wireless devices by providing for retransmission from a base station. For example, the method may help improve reliability and/or latency for devices, such as a PLC involved in IIoT communication, while also improving the efficient use of wireless resources.

At 1802, the wireless device selects a first BWP for transmitting data for at least one additional wireless device. The at least one additional wireless device may include a sensor/actuator, as described in connection with any of FIGS. 4A-11. The first BWP may be based on a BWP for a base station. The selection may be performed, e.g., by the BWP component 2008 of the apparatus 2002 in FIG. 20.

At 1804, the wireless device transmits the data for the at least one additional wireless device using the selected BWP. The transmission may be performed, e.g., by the transmission component 2006 of the apparatus 2002 in FIG. 20. The data may be transmitted to the at least one additional wireless device in a downlink transmission or a sidelink transmission using the BWP of the base station.

The data may be transmitted in a downlink transmission or a sidelink transmission to the at least one additional wireless device using a first BWP, and at 1806, the wireless device may further transmit the data in an uplink transmission to the base station using a second BWP. The transmission may be performed, e.g., by the transmission component 2006 of the apparatus 2002 in FIG. 20.

Figure 19:
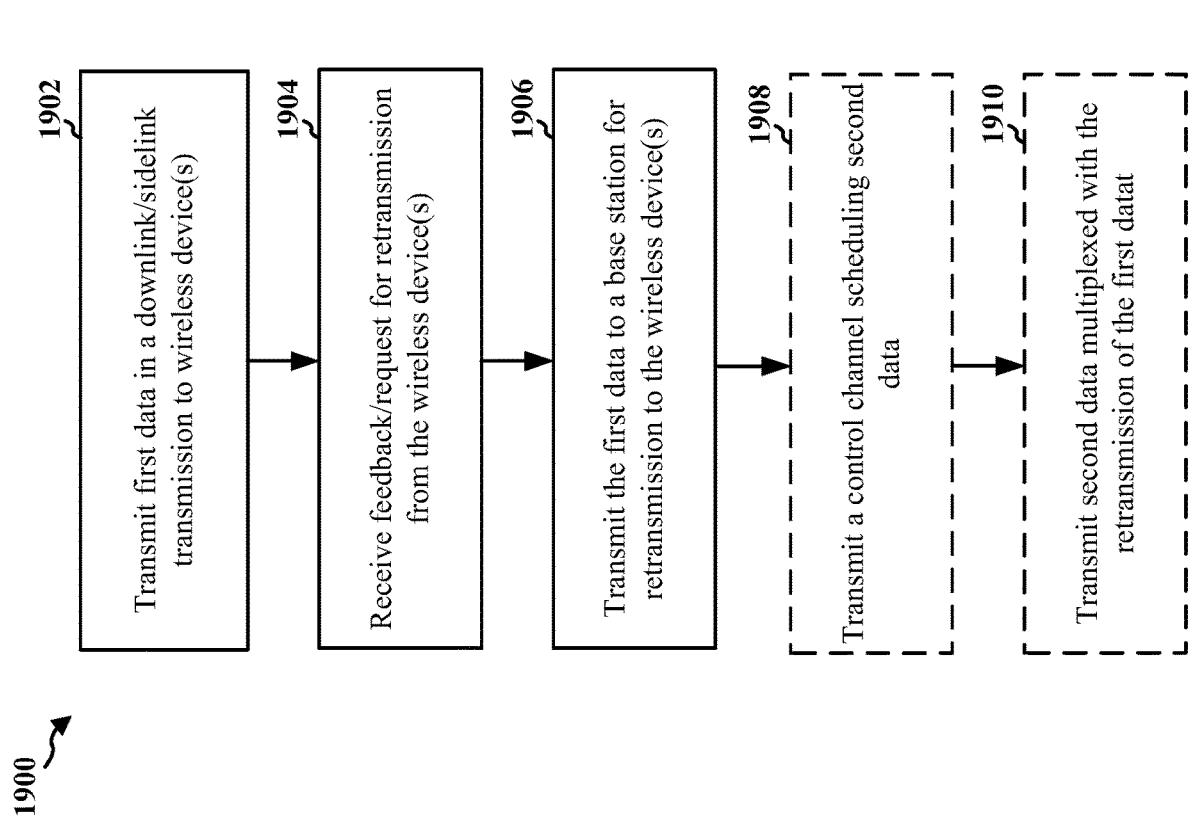
FIG. 19 is a flowchart of a method of wireless communication.

FIG. 19 is a flowchart 1900 of a method of wireless communication. The method may be performed by a wireless device that transmits downlink or sidelink communication to at least one wireless device and that communicates with a base station using a Uu link. For example, the method may be performed by a PLC or a component of a PLC (e.g., the PLC 145, 402, 602, 602*a*, 602*b*, 702*a*, 702*b*, 1002, 1102; the apparatus 2002/2002'; the device 350; a processing system 2114, which may include the memory 360 and which may be the entire PLC or a component of the PLC, such as the TX processor 368, the RX processor 356, and/or the controller/processor 359). Optional aspects are illustrated with a dashed line. The method may help improve reliability and/or latency of wireless communication for a device that receives uplink/sidelink communication from other wireless devices by providing for retransmission from a base station. For example, the method may help improve reliability and/or latency for devices, such as a PLC involved in IIoT communication, while also improving the efficient use of wireless resources.

At 1902, the wireless device transmits first data in a downlink transmission or a sidelink transmission to at least one additional wireless device. The transmission may be performed, e.g., by the data component 2010 of the apparatus 2002 in FIG. 20. The wireless device may comprise a PLC and the at least one additional wireless device may include at least one sensor or actuator, or UE, such as described in connection with any of FIGS. 4A-11. The first data may be transmitted using reserved resources. The reserved resources may be orthogonal to resources reserved for another PLC. The reserved resources may be based on SPS. The wireless device may transmit the first data to the at least one additional wireless device using first resources based on semi-persistent scheduling or second resources scheduled by a downlink control channel or a sidelink control channel.

At 1904, the wireless device receives HARQ feedback or a request for a retransmission for the first data from the at least one additional wireless device. The reception may be performed, e.g., by the feedback component 2012 of the apparatus 2002 in FIG. 20. The wireless device may transmit the first data in the downlink transmission to the at least one additional wireless device, and the HARQ feedback or the request for the retransmission may be received in an uplink transmission from the at least one additional wireless device. In other aspects, the wireless device may transmit the first data to the at least one additional wireless device and receive the HARQ feedback or the request for the retransmission from the at least one additional wireless device using sidelink.

At 1906, the wireless device transmits the first data in an uplink channel to a base station for the retransmission to the at least one additional wireless device in response to the HARQ feedback or the request for the retransmission. The transmission may be performed, e.g., by the data component 2010 of the apparatus 2002 in FIG. 20. FIGS. 9 and 11 illustrate examples of a PLC transmitting data to a base station for retransmission to a sensor/actuator.

As illustrated at 1908, the wireless device may transmit a control channel to the at least one additional wireless device scheduling the second data, where the control channel overlaps in time with a downlink control channel from the base station scheduling the retransmission of the first data. FIG. 9 illustrates an example of the PDCCH from a PLC being multiplexed with a PDCCH by a base station that is scheduling a retransmission. The transmission may be performed, e.g., by the control component 2014 of the apparatus 2002 in FIG. 20.

As illustrated at 1910, the wireless device may transmit second data to the at least one additional wireless device, where the second data is multiplexed with the retransmission of the first data from the base station. FIG. 9 illustrates an example of the data from a PLC being multiplexed with a retransmission of data by a base station. The transmission may be performed, e.g., by the data component 2010 of the apparatus 2002 in FIG. 20.

Figure 20:
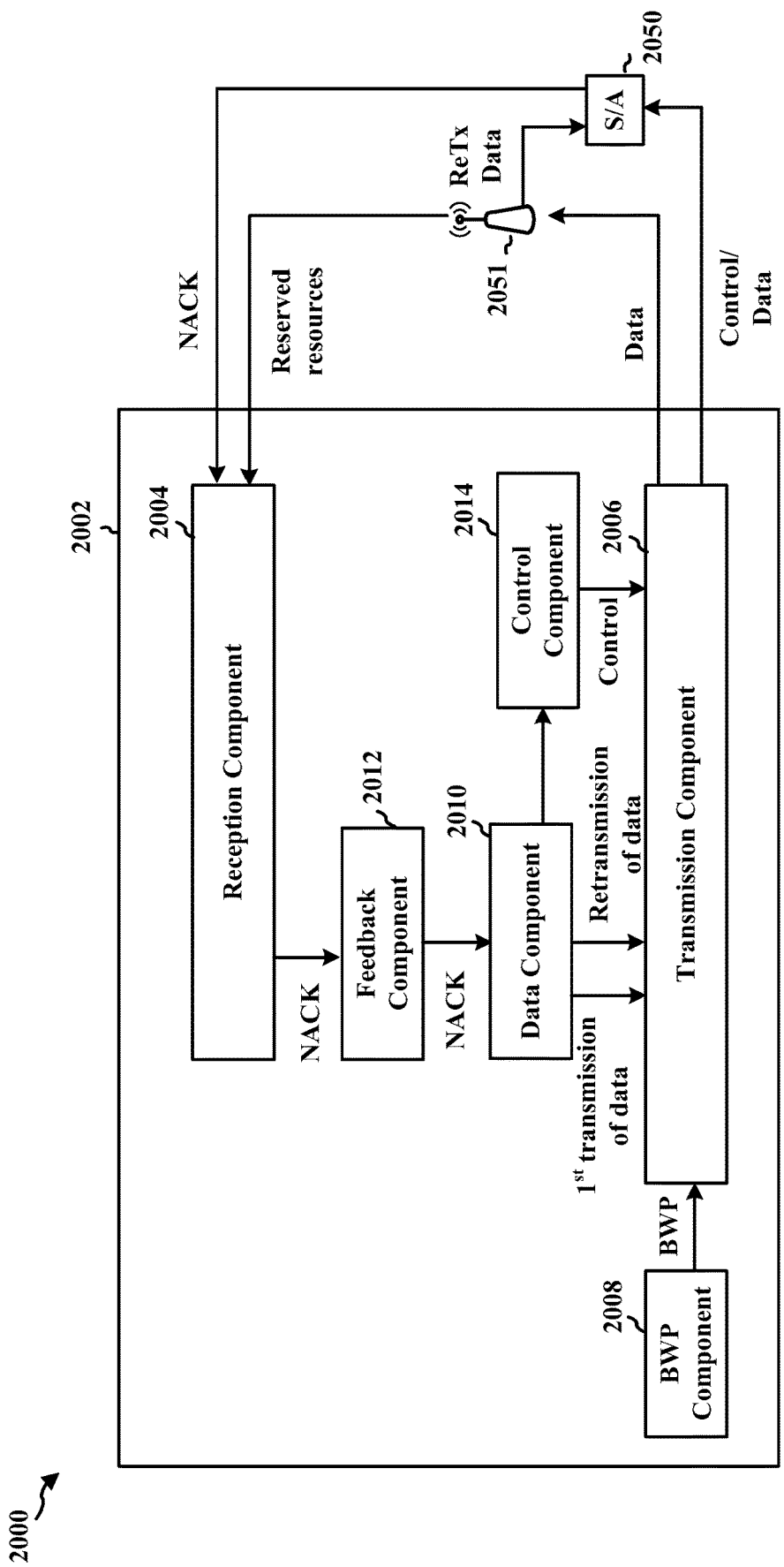
FIG. 20 is a conceptual data flow diagram illustrating the data flow between different means/components in an example apparatus.

FIG. 20 is a conceptual data flow diagram 2000 illustrating the data flow between different means/components in an example apparatus 2002. The apparatus may be a wireless device such as a PLC or a component of a PLC (e.g., PLC 145, 402, 602, 602a, 602b, 702a, 702b, 1002, 1102). The apparatus 2002 includes a reception component 2004 that is configured to receive sidelink or uplink transmissions from at least one wireless device 2050, such as a sensor/actuator. The reception component 2004 may also be configured to receive downlink communication from a base station 2051. The apparatus 2002 includes a transmission component 2006 that is configured to transmit sidelink or downlink transmissions to at least one wireless device 2050, such as a sensor/actuator. The transmission component 2006 may also be configured to transmit uplink communication to the base station 2051. The apparatus includes a BWP component 2008 configured to select a BWP for transmitting data for at least one additional wireless device, where the BWP is based on a BWP for a base station, e.g., as described in connection with FIG. 18. The apparatus includes a data component 2010 configured to transmit the data for the at least one additional wireless device using the selected BWP, e.g., as described in connection with FIG. 18. The data component 2010 may be configured to transmit first data in a downlink transmission or a sidelink transmission to at least one additional wireless device, e.g., as described in connection with 1902 in FIG. 19. The apparatus 2002 may include a feedback component 2012 configured to receive HARQ feedback or a request for a retransmission for the first data from the at least one additional wireless device, e.g., as described in connection with 1904 in FIG. 19. The data component 2010 may be configured to transmit the first data in an uplink channel to a base station for the retransmission to the at least one additional wireless device in response to the HARQ feedback or the request for the retransmission, e.g., as described in connection with 1906 in FIG. 19. The data component 2010 may be configured to transmit second data to the at least one additional wireless device, where the second data is multiplexed with the retransmission of the first data from the base station, e.g., as described in connection with 1910 in FIG. 19. The apparatus 2002 may include a control component 2014 configured to transmit a control channel to the at least one additional wireless device scheduling the second data, wherein the control channel overlaps in time with a downlink control channel from the base station scheduling the retransmission of the first data, e.g., as described in connection with 1908 in FIG. 19.

The method may be performed by an apparatus that includes components configured to perform each of the blocks of the algorithm in the aforementioned flowcharts of FIGS. 18 and/or 19, as well as any of the aspects described in connection with the PLC in FIGS. 4A-11. As such, each block in the aforementioned flowcharts of FIGS. 18 and/or 19, as well as any of the aspects described in connection with the PLC in FIGS. 4A-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
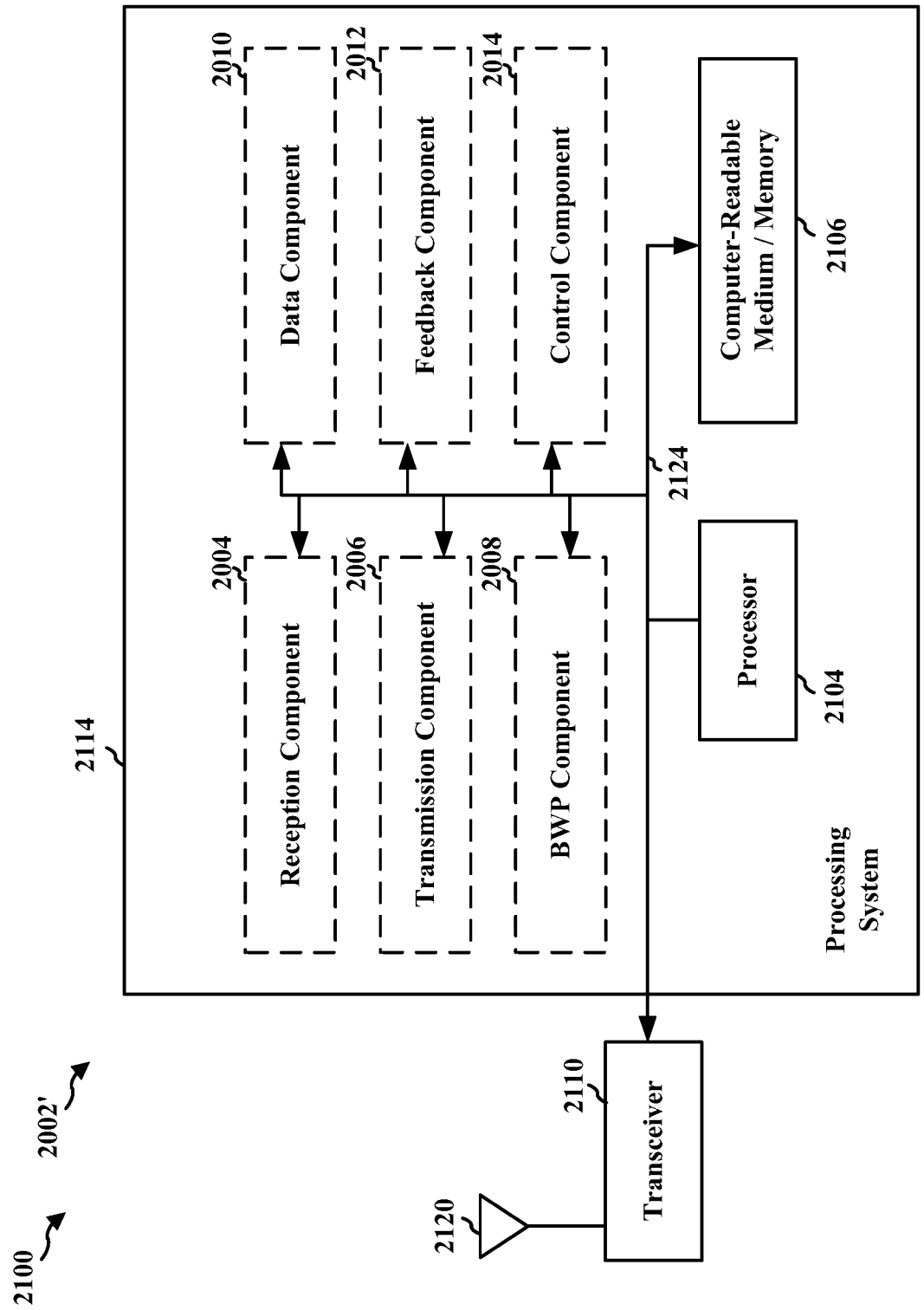
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012, 2014, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2006, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012, 2014. The components may be software components running in the processor 2104, resident/stored in the computer readable medium/memory 2106, one or more hardware components coupled to the processor 2104, or some combination thereof. The processing system 2114 may be a component of the device 350 and may include the memory 360 and/or at least one of the TX processor 368, the RX processor 356, and the controller/processor 359. Alternatively, the processing system 2114 may be the entire device (e.g., see 350 of FIG. 3).

In one configuration, the apparatus 2002/2002' for wireless communication includes means for selecting a first BWP for transmitting data for at least one additional wireless device, where the BWP is based on a BWP for a base station and means for transmitting the data for the at least one additional wireless device using the selected BWP. The apparatus may include means for transmitting the data in a downlink transmission or a sidelink transmission to at least one additional wireless device using a first BWP and for transmitting the data in an uplink transmission to the base station using a second BWP. The apparatus may include means for transmitting first data in a downlink transmission or a sidelink transmission to at least one additional wireless device, means for receiving HARQ feedback or a request for a retransmission for the first data from the at least one additional wireless device, and means for transmitting the first data in an uplink channel to a base station for the retransmission to the at least one additional wireless device in response to the HARQ feedback or the request for the retransmission. The apparatus may further include means for transmitting second data to the at least one additional wireless device, where the second data is multiplexed with the retransmission of the first data from the base station. The apparatus may further include means for transmitting a control channel to the at least one additional wireless device scheduling the second data, wherein the control channel overlaps in time with a downlink control channel from the base station scheduling the retransmission of the first data. The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other embodiments or teaching described herein, without limitation.

Example 1 is a method of wireless communication at a base station, comprising: receiving feedback for a first data transmission or an indication to retransmit a first data transmission, the first data transmission being transmitted to at least one wireless device from another wireless device; and transmitting, in response to the feedback or the indication, a retransmission of the first data transmission in a downlink transmission to the at least one wireless device. In Example 2, the method of Example 1 further includes that the at least one wireless device includes at least one sensor or actuator, and wherein the other wireless device include a programmable logic controller (PLC). In Example 3, the method of Example 1 or Example 2 further includes that the feedback includes hybrid automatic repeat request (HARQ) feedback received in an uplink control channel from the at least one wireless device. In Example 4, the method of any of Examples 1-3 further includes receiving the first data transmission from the other wireless device using reserved resources in one or more of time or frequency. In Example 5, the method of any of Examples 1-4 further includes reserving orthogonal resources for data transmissions from different devices. In Example 6, the method of any of Examples 1-5 further includes measuring interference for the different devices, wherein the orthogonal resources are reserved based on the measured interference. In Example 7, the method of any of Examples 1-6 further includes that the base station uses a different bandwidth part (BWP) than the other wireless device uses for transmissions to the at least one wireless device, and wherein the first data transmission is received in a BWP of the base station. In Example 8, the method of any of Examples 1-7 further includes that the base station uses a different bandwidth part (BWP) than the other wireless device, and wherein the first data transmission is received in a BWP used by the other wireless device to transmit the first data transmission to the at least one wireless device. In Example 9, the method of any of Examples 1-8 further includes that the base station receives the indication to retransmit the first data transmission from the other wireless device, wherein the indication includes an uplink transmission of the first data transmission from the other wireless device In Example 10, the method of any of Examples 1-9 further includes receiving the first data transmission from the other wireless device using first reserved resources, and wherein the base station transmits the retransmission of the first data transmission using second reserved resources. In Example 11, the method of any of Examples 1-10 further includes reserving orthogonal resources for data transmissions from different devices. In Example 12, the method of any of Examples 1-11 further includes that the reserved resources are based on semi-persistent scheduling. In Example 13, the method of any of Examples 1-12 further includes that the retransmission of the first data transmission is multiplexed with a second data transmission from the other wireless device, wherein the method further comprises: transmitting a first control channel to the at least one wireless device scheduling the retransmission of the first data transmission, wherein the control channel overlaps in time with a second control channel from the other wireless device scheduling the second data transmission.

Example 14 is a device including one or more processors and one or more memories in electronic communication with the one or more processors storing instructions executable by the one or more processors to cause the device to implement a method as in any of Examples 1-13.

Example 15 is a system or apparatus including means for implementing a method or realizing an apparatus as in any of Examples 1-13.

Example 16 is a non-transitory computer readable medium storing instructions executable by one or more processors to cause the one or more processors to implement a method as in any of Examples 1-13.

Example 17 is a method of wireless communication, comprising: receiving data from a wireless device in a downlink transmission or a sidelink transmission; transmitting feedback for the data to one or more of the wireless device or a base station; and receiving a retransmission of the data in a downlink transmission from the base station. In Example 18, the method of Example 17 further includes using an increased transmission power for transmitting the feedback. In Example 19, the method of Example 17 or Example 18 further includes that the increased transmission power is based on a first maximum transmission power for a transmission to the wireless device or a second maximum transmission power for an uplink transmission to the base station. In Example 20, the method of any of Examples 17-19 further includes that the method is performed by a sensor, an actuator, or a user equipment, and wherein the wireless device comprises a programmable logic controller (PLC).

Example 21 is a device including one or more processors and one or more memories in electronic communication with the one or more processors storing instructions executable by the one or more processors to cause the device to implement a method as in any of Examples 17-20.

Example 22 is a system or apparatus including means for implementing a method or realizing an apparatus as in any of Examples 17-20.

Example 23 is a non-transitory computer readable medium storing instructions executable by one or more processors to cause the one or more processors to implement a method as in any of Examples 17-20.

Example 24 is a method of wireless communication at a wireless device, comprising: selecting a first bandwidth part (BWP) for transmitting data for at least one additional wireless device, wherein the BWP is based on a BWP for a base station; and transmitting the data for the at least one additional wireless device using the selected BWP. In Example 25, the method of Example 24 further includes that the data is transmitted in a downlink transmission or a sidelink transmission to the at least one additional wireless device using a first bandwidth part (BWP), the method further comprising: transmitting the data in an uplink transmission to the base station using a second BWP. In Example 26, the method of Example 24 or 25 further includes that the data is transmitted to the at least one additional wireless device in a downlink transmission or a sidelink transmission using the BWP of the base station. In Example 27, the method of any of Examples 24-26 further include that the method is performed by a programmable logic controller (PLC) and the at least one additional wireless device includes at least one sensor or actuator.

Example 28 is a device including one or more processors and one or more memories in electronic communication with the one or more processors storing instructions executable by the one or more processors to cause the device to implement a method as in any of Examples 24-27.

Example 29 is a system or apparatus including means for implementing a method or realizing an apparatus as in any of Examples 24-27.

Example 30 is a non-transitory computer readable medium storing instructions executable by one or more processors to cause the one or more processors to implement a method as in any of Examples 24-27.

Example 31 is a method of wireless communication at a wireless device, comprising: transmitting first data in a downlink transmission or a sidelink transmission to at least one additional wireless device; receiving hybrid automatic repeat request (HARQ) feedback or a request for a retransmission for the first data from the at least one additional wireless device; and transmitting the first data in an uplink channel to a base station for the retransmission to the at least one additional wireless device in response to the HARQ feedback or the request for the retransmission. In Example 32, the method of Example 31 further includes that the wireless device comprises a programmable logic controller (PLC) and the at least one additional wireless device includes at least one sensor or actuator. In Example 33, the method of Example 31 or 32 further includes that the first data is transmitted using reserved resources. In Example 34, the method of any of Examples 31-33 further includes that the reserved resources are orthogonal to resources reserved for another programmable logic controller (PLC). In Example 35, the method of any of Examples 31-34 further includes that the reserved resources are based on semi-persistent scheduling (SPS). In Example 36, the method of any of Examples 31-35 further includes that the wireless device transmits the first data to the at least one additional wireless device using first resources based on semi-persistent scheduling or second resources scheduled by a downlink control channel or a sidelink control channel. In Example 37, the method of any of Examples 31-36 further includes that the wireless device transmits the first data in the downlink transmission to the at least one additional wireless device, and the HARQ feedback or the request for the retransmission is received in an uplink transmission from the at least one additional wireless device. In Example 38, the method of any of Examples 31-37 further includes that the wireless device transmits the first data to the at least one additional wireless device and receives the HARQ feedback or the request for the retransmission from the at least one additional wireless device using sidelink. In Example 39, the method of any of Examples 31-38 further includes transmitting second data to the at least one additional wireless device, wherein the second data is multiplexed with the retransmission of the first data from the base station; or transmitting a control channel to the at least one additional wireless device scheduling the second data, wherein the control channel overlaps in time with a downlink control channel from the base station scheduling the retransmission of the first data.

Example 40 is a device including one or more processors and one or more memories in electronic communication with the one or more processors storing instructions executable by the one or more processors to cause the device to implement a method as in any of Examples 31-39.

Example 41 is a system or apparatus including means for implementing a method or realizing an apparatus as in any of Examples 31-39.

Example 42 is a non-transitory computer readable medium storing instructions executable by one or more processors to cause the one or more processors to implement a method as in any of Examples 31-39.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
 receiving, at the base station, feedback for a first data transmission or an indication to retransmit the first data transmission, the first data transmission being a previous transmission from a first wireless device to at least one second wireless device, the first wireless device and the at least one second wireless device being different than the base station; and
 transmitting, in response to the feedback or the indication, a retransmission of the first data transmission in a downlink transmission from the base station to the at least one second wireless device, wherein the retransmission of the first data transmission from the base station is multiplexed with a second data transmission from the first wireless device.

2. The method of claim 1, wherein the at least one second wireless device includes at least one sensor or actuator, and wherein the first wireless device includes a programmable logic controller (PLC).

3. The method of claim 1, wherein the feedback includes hybrid automatic repeat request (HARQ) feedback received in an uplink control channel from the at least one second wireless device.

4. The method of claim 1, further comprising:
 receiving the first data transmission from the first wireless device using reserved resources in one or more of time or frequency.

5. The method of claim 4, further comprising:
 reserving orthogonal resources for data transmissions from different devices.

6. The method of claim 5, further comprising:
 measuring interference for the different devices, wherein the orthogonal resources are reserved based on the measured interference.

7. The method of claim 4, wherein the base station uses a different bandwidth part (BWP) than the first wireless device uses for transmissions to the at least one second wireless device, and wherein the first data transmission is received in a BWP of the base station.

8. The method of claim 4, wherein the base station uses a different bandwidth part (BWP) than the first wireless device, and wherein the first data transmission is received in a BWP used by the first wireless device to transmit the first data transmission to the at least one second wireless device.

9. The method of claim 1, wherein the base station receives the indication to retransmit the first data transmission from the first wireless device, wherein the indication includes an uplink transmission of the first data transmission from the first wireless device.

10. The method of claim 9, further comprising:
 receiving the first data transmission from the first wireless device using first reserved resources, and wherein the base station transmits the retransmission of the first data transmission using second reserved resources.

11. The method of claim 10, further comprising:
 reserving orthogonal resources for data transmissions from different devices.

12. The method of claim 11, further comprising:
 wherein the reserved orthogonal resources are based on semi-persistent scheduling.

13. The method of claim 1, wherein the method further comprises:
 transmitting a first control channel to the at least one second wireless device scheduling the retransmission of the first data transmission, wherein the first control channel overlaps in time with a second control channel from the first wireless device scheduling the second data transmission.

14. A method of wireless communication, comprising:
 receiving a first data in an initial transmission from a first wireless device in a first downlink transmission or a sidelink transmission;
 transmitting feedback for the first data to one or more of the first wireless device or a base station that is different than the first wireless device; and
 receiving a retransmission of the first data in a second downlink transmission from the base station in response to the feedback for the first data in the initial transmission from the first wireless device, wherein the retransmission of the first data from the base station is multiplexed with a second data transmission from the first wireless device.

15. The method of claim 14, further comprising:
 using an increased transmission power for transmitting the feedback.

16. The method of claim 15, wherein the increased transmission power is based on a first maximum transmission power for a transmission to the first wireless device or a second maximum transmission power for an uplink transmission to the base station.

17. The method of claim 14, wherein the method is performed by a sensor, an actuator, or a user equipment, and wherein the first wireless device comprises a programmable logic controller (PLC).

18. A method of wireless communication at a first wireless device, comprising:
 selecting, by the first wireless device, a first bandwidth part (BWP) for transmitting data to at least one additional wireless device, wherein the first BWP is based on a BWP for a base station that is different than the first wireless device uses for other transmissions, wherein the at least one additional wireless device is different than the base station;
 transmitting, from the first wireless device, the data in a downlink transmission or a sidelink transmission to the at least one additional wireless device using the first BWP for the base station; and
 retransmitting, from the first wireless device, the data in an uplink transmission to the base station using a second BWP.

19. The method of claim 18, wherein the data is transmitted from the first wireless device to the at least one additional wireless device in the downlink transmission or the sidelink transmission using the BWP of the base station.

20. The method of claim 18, wherein the method is performed by a programmable logic controller (PLC) and the at least one additional wireless device includes at least one sensor or actuator.

21. The method of claim 18, wherein the data is transmitted from the first wireless device, in the downlink transmission to the at least one additional wireless device using the first BWP for the base station.

22. The method of claim 18, wherein the data is transmitted from the first wireless device, in the sidelink transmission to the at least one additional wireless device using the first BWP for the base station.

23. A method of wireless communication at a first wireless device, comprising:
- transmitting, from the first wireless device, first data in a downlink transmission or a sidelink transmission to at least one additional wireless device;
- receiving, at the first wireless device, hybrid automatic repeat request (HARQ) feedback or a request for a retransmission for the first data from the at least one additional wireless device;
- retransmitting the first data in an uplink channel from the first wireless device to a base station for the retransmission to the at least one additional wireless device in response to the HARQ feedback or the request for the retransmission from the at least one additional wireless device, the base station being different than the first wireless device and the at least one additional wireless device; and
- transmitting second data to the at least one additional wireless device, wherein the second data is multiplexed with the retransmission of the first data from the base station.

24. The method of claim 23, wherein the first wireless device comprises a programmable logic controller (PLC) and the at least one additional wireless device includes at least one sensor or actuator.

25. The method of claim 23, wherein the first data is transmitted using reserved resources.

26. The method of claim 25, wherein the reserved resources are orthogonal to resources reserved for another programmable logic controller (PLC).

27. The method of claim 25, wherein the reserved resources are based on semi-persistent scheduling (SPS).

28. The method of claim 23, wherein the first wireless device transmits the first data to the at least one additional wireless device using first resources based on semi-persistent scheduling or second resources scheduled by a downlink control channel or a sidelink control channel.

29. The method of claim 23, wherein the first wireless device transmits the first data in the downlink transmission to the at least one additional wireless device, and the HARQ feedback or the request for the retransmission is received in an uplink transmission from the at least one additional wireless device.

30. The method of claim 23, wherein the first wireless device transmits the first data to the at least one additional wireless device and receives the HARQ feedback or the request for the retransmission from the at least one additional wireless device using sidelink.

31. The method of claim 23, further comprising:
- transmitting a control channel to the at least one additional wireless device scheduling the second data, wherein the control channel overlaps in time with a downlink control channel from the base station scheduling the retransmission of the first data.

* * * * *